United States Patent
Okumura et al.

(10) Patent No.: US 10,774,221 B2
(45) Date of Patent: Sep. 15, 2020

(54) HYDROPHILIC TREATMENT COATING COMPOSITION AND HYDROPHILIZING TREATMENT METHOD

(71) Applicants: Lixil Corporation, Tokyo (JP); Nippon Paint Automotive Coatings Co., Ltd., Osaka (JP)

(72) Inventors: Yoshihito Okumura, Handa (JP); Yusuke Sato, Handa (JP); Hiroshi Kakehi, Toyota (JP); Hirotsugu Mano, Osaka (JP); Akira Kamitani, Osaka (JP)

(73) Assignees: Lixil Corporation, Tokyo (JP); Nippon Paint Automotive Coatings Co., Ltd., Osaka (JP)

( * ) Notice: Subject to any disclaimer, the term of this patent is extended or adjusted under 35 U.S.C. 154(b) by 0 days.

(21) Appl. No.: 16/589,468

(22) Filed: Oct. 1, 2019

(65) Prior Publication Data

US 2020/0032070 A1 Jan. 30, 2020

Related U.S. Application Data

(63) Continuation of application No. 15/325,276, filed as application No. PCT/JP2015/070347 on Jul. 16, 2015.

(30) Foreign Application Priority Data

Jul. 16, 2014 (JP) ................... 2014-145541
Jul. 16, 2014 (JP) ................... 2014-145542

(51) Int. Cl.
| | | |
|---|---|---|
| *C09D 4/00* | (2006.01) | |
| *B05D 5/00* | (2006.01) | |
| *B05D 7/00* | (2006.01) | |
| *C09K 3/00* | (2006.01) | |
| *C08F 220/58* | (2006.01) | |
| *C09D 133/24* | (2006.01) | |

(52) U.S. Cl.
CPC ............ *C09D 4/00* (2013.01); *B05D 5/00* (2013.01); *B05D 7/00* (2013.01); *C08F 220/58* (2013.01); *C09D 133/24* (2013.01); *C09K 3/00* (2013.01)

(58) Field of Classification Search
CPC ....................................................... C09D 4/00
See application file for complete search history.

(56) References Cited

U.S. PATENT DOCUMENTS

| | | |
|---|---|---|
| 4,201,848 A | 5/1980 | Kotani et al. |
| 5,676,745 A | 10/1997 | Kelly et al. |
| 2008/0292800 A1 | 11/2008 | Murayama et al. |
| 2011/0262738 A1 | 10/2011 | Niguma et al. |
| 2013/0217620 A1 | 8/2013 | Alli et al. |

FOREIGN PATENT DOCUMENTS

| | | |
|---|---|---|
| GB | 896510 A | 5/1962 |
| GB | 981678 A | 1/1965 |
| GB | 1309811 A | 3/1973 |
| JP | 60-240769 | 11/1985 |
| JP | 05-202216 | 8/1993 |
| JP | 08-027290 | 1/1996 |
| JP | 08-259270 | 10/1996 |
| JP | 2002-265312 A | 9/2002 |
| JP | 2007-138104 A | 6/2007 |
| JP | 2008073963 A | 4/2008 |
| JP | 2008200881 A | 9/2008 |
| JP | 2013-071118 A | 4/2013 |
| JP | 2013095958 A | 5/2013 |
| JP | 2014-074158 A | 4/2014 |
| JP | 2014-111745 A | 6/2014 |

OTHER PUBLICATIONS

Japanese Patent Office, Search Report in International Patent Application No. PCT/JP2015/070347 dated Oct. 20, 2015.
Japanese Patent Office, Office Action issued in Japanese Patent Application No. 2014-145541, dated Aug. 3, 2017, 3 pages.
Japanese Patent Office, Office Action issued in Japanese Patent Application No. 2014-145542 dated Aug. 3, 2017, 2 pages.
European Patent Office, Search Report issued in EP 15821270.4 dated Jan. 5, 2018, 7 pages.
U.S. Patent and Trademark Office, Office Action issued in corresponding U.S. Appl. No. 15/325,276 dated Nov. 2, 2018, 23 pages.
U.S. Patent and Trademark Office, Final Office Action issued in corresponding U.S. Appl. No. 15/325,276 dated Jun. 3, 2019, 9 pages.

*Primary Examiner* — Michael F Pepitone
(74) *Attorney, Agent, or Firm* — Wood Herron & Evans LLP

(57) ABSTRACT

Provided are (1) a hydrophilic treatment coating composition containing a compound that contains a radical reactive functional group and a sulfonic acid alkali metal salt group, a radical polymerization initiator, and a polar compatibilizer, (2) a hydrophilic treatment coating composition containing a silane coupling agent that contains a radical reactive functional group, a compound that contains a radical reactive functional group and a sulfonic acid alkali metal salt group, a radical polymerization initiator, and a polar compatibilizer, (3) a hydrophilic treatment coating composition containing a compound that contains a functional group that reacts with a reactive functional group of a silane coupling agent in a surface layer, and a sulfonic acid (alkali metal salt) group, and a polar compatibilizer, and (4) a hydrophilic treatment coating composition containing a silane coupling agent that contains a reactive functional group, a compound that contains a functional group that reacts with the reactive functional group and a sulfonic acid (alkali metal salt) group, and a polar compatibilizer.

6 Claims, No Drawings

HYDROPHILIC TREATMENT COATING COMPOSITION AND HYDROPHILIZING TREATMENT METHOD

CROSS-REFERENCE TO RELATED APPLICATIONS

This application is a continuation of U.S. patent application Ser. No. 15/325,276, filed Jan. 10, 2017 (U.S. Pat. No. 10,563,067, issued Feb. 18, 2020), which is a 371 of International Patent Application Serial No. PCT/JP2015/070347, filed on Jul. 16, 2015, which claims priority to Japanese Patent Application Nos. 2014-145541 and 2014-145542, filed on Jul. 16, 2014, the disclosures of which are hereby incorporated by reference herein.

TECHNICAL FIELD

The present invention relates to a composition that is used in a hydrophilic treatment of a surface layer, which contains an inorganic compound, of crockery, glass, metal, and the like so as to improve washability, and a method thereof.

BACKGROUND ART

In the related art, with respect to crockery such as a toilet bowl and a washstand which are installed at a water-using site in a building, and the like, various kinds of surface treatments are performed to make washing of a surface contaminant easy. Recently, in a contaminant, an oily component has been increased due to an effect of westernization in a dietary life of human beings, and thus it is difficult to sufficiently wash a contaminant from a surface of the crockery.

Although not intended to wash a surface, Patent Document 1 discloses a method in which a surface of a material mainly containing silicon oxide is treated with a silane coupling agent, and then a reactive surfactant, which has a reactive group such as an acryloyl group or a vinyl group in the middle of a side chain or a hydrophobic group, is allowed to react with the surface so as to give an anti-fog property, an antifouling property, and the like to a glass product. Patent Document 1 also discloses a specific compound in the method.

Patent Document 2 discloses a composition that contains a silane coupling agent that includes an epoxy group and an isocyanate group, a hydrophilic polymer having a functional group that is allowed to react with the epoxy group and the isocyanate group, and a hydrophilic group such as potassium sulphonate, and an alkoxide compound such as tetraalkoxysilane, and the like so as to form a hydrophilic film excellent in the antifouling property and abrasion resistance on a surface of a base material such as a glass plate.

CITATION LIST

Patent Literature

[Patent Document 1] Japanese Unexamined Patent Application, First Publication No. H8-259270
[Patent Document 2] Japanese Unexamined Patent Application, First Publication No. 2007-138104

SUMMARY OF INVENTION

Technical Problem

However, in the method of using the compound disclosed in Patent Document 1, the compound has a branched chain structure having 9 to 12 carbon atoms, and thus it is difficult for hydrophilic portions to concentrate on a surface. Therefore, there is a concern that even when the compound is used in the crockery such as the toilet bowl and the washstand which are frequently subjected to washing with water, sufficient washability is not provided.

In addition, when using a compound that does not have the branched structure, hydrophilicity of a hydrophilic group is high, and thus the hydrophilic group is likely to be crystallized. Therefore, it is difficult to uniformly hydrophilize the surface of the crockery and the like.

In addition, when the composition disclosed in Patent Document 2 is formed as a film on a surface of a glass substrate and the like, a weight-average molecular weight of the hydrophilic polymer is 3000 to 9900, and a main chain is long, and thus the hydrophilic group is less likely to concentrate on a surface. Accordingly, there is a concern that the hydrophilicity of a coated film is not sufficient.

Accordingly, an object of the invention is to provide a hydrophilic treatment agent and a hydrophilic treatment method which are capable of reducing the number of washing times by preventing calcium and the like from being settled to crockery such as toilet bowl and a washstand, which are installed in a water-using site in a building and contains an inorganic compound such as silicon oxide, and the like, and by making washing off of an oily contaminant, which becomes a cause for propagation of a fungi and an offensive odor, easy.

Solution to Problem

According to a first aspect of the invention, the following hydrophilic treatment coating compositions of [1] to [5] are provided.

[1] A hydrophilic treatment coating composition that allows a surface layer that contains an inorganic compound to react with a radical reactive functional group of a silane coupling agent after a treatment of the surface layer with a silane coupling agent that contains the radical reactive functional group. The hydrophilic treatment coating composition contains: a hydrophilic compound that contains a radical reactive functional group and an alkali metal salt of a sulfonic acid group, does not contain a hydrophilic portion at a site other than an end of a molecular chain, and does not contain a branched chain; a radical polymerization initiator; and a polar compatibilizer.

The hydrophilic treatment coating composition of this aspect of the invention is a composition that hydrophilizes the surface layer that contains the inorganic compound after the treatment of the surface layer with the silane coupling agent that contains the radical reactive functional group.

Here, specifically, the hydrophilic portion represents a nonionic hydrophilic group such as ethylene oxide, a hydroxyl group, and an amino group, and the like.

When one end of a molecular chain of the hydrophilic compound is set as a first end, and the other end is set as a second end, the hydrophilic compound has the radical reactive functional group at the first end of the molecular chain, and has the alkali metal salt of the sulfonic acid group at the second end of the molecular chain. The hydrophilic compound does not contain the hydrophilic portion at a site other than the first end and the second end, and does not have a branched chain. That is, when the one end of the molecular chain of the hydrophilic compound is set as the first end, and the other end is set as the second end, the hydrophilic compound has the radical reactive functional group at the first end of the molecular chain, and has the alkali metal salt of the sulfonic acid group at the second end of the molecular chain. The hydrophilic compound does not contain a hydrophilic portion other than the radical reactive functional group and the sulfonic acid group, and does not have the branched chain.

When the one end of the molecular chain of the hydrophilic compound is set as the first end, and the other end is set as the second end, it is preferable that the hydrophilic compound has the radical reactive functional group at the first end of the molecular chain, has the alkali metal salt of the sulfonic acid group at the second end of the molecular chain, does not contain a hydrophilic portion at a site other than the first end and the second end, that is, a hydrophilic portion other than the radical reactive functional group and the sulfonic acid group, and does not have a branched chain having 5 or more carbon atoms.

[2] A hydrophilic treatment coating composition that is allowed to react with a surface layer that contains an inorganic compound. The hydrophilic treatment coating composition contains: a silane coupling agent that contains a radical reactive functional group; a hydrophilic compound that contains a radical reactive functional group and an alkali metal salt of a sulfonic acid group, does not contain a hydrophilic portion at a site other than an end of a molecular chain, and does not contain a branched chain; a radical polymerization initiator; and a polar compatibilizer.

This composition is a composition that hydrophilizes the surface layer that is not treated with the silane coupling agent and contains the inorganic compound.

Specifically, the hydrophilic portion represents a nonionic hydrophilic group such as ethylene oxide, a hydroxyl group, and an amino group, and the like.

Here, the silane coupling agent has the radical reactive functional group. When one end of a molecular chain of the hydrophilic compound is set as a first end and the other end is set as a second end, the hydrophilic compound has the radical reactive functional group at the first end of the molecular chain, and has the alkali metal salt of the sulfonic acid group at the second end of the molecular chain. The hydrophilic compound does not contain the hydrophilic portion at a site other than the first end and the second end, and does not have a branched chain.

That is, when the one end of the molecular chain of the hydrophilic compound is set as the first end, and the other end is set as the second end, the hydrophilic compound has the radical reactive functional group at the first end of the molecular chain, and has the alkali metal salt of the sulfonic acid group at the second end of the molecular chain. The hydrophilic compound does not contain a hydrophilic portion other than the radical reactive functional group and the sulfonic acid group, and does not have the branched chain.

When the one end of the molecular chain of the hydrophilic compound is set as the first end, and the other end is set as the second end, it is preferable that the hydrophilic compound has the radical reactive functional group at the first end of the molecular chain, has the alkali metal salt of the sulfonic acid group at the second end of the molecular chain, does not contain a hydrophilic portion at a site other than the first end and the second end, that is, a hydrophilic portion other than the radical reactive functional group and the sulfonic acid group, and does not have a branched chain having 5 or more carbon atoms.

[3] In the hydrophilic treatment coating composition according to [1] or [2], the radical reactive functional group of the hydrophilic compound may be at least one kind that is selected from an acrylamide group, an acryloyl group, a methacryloyl group, an allyl group, a vinyl group, a styryl group, and a mercapto group.

[4] In the hydrophilic treatment coating composition according to any one of [1] to [3], a number-average molecular weight of the hydrophilic compound may be 70 to 500.

[5] In the hydrophilic treatment coating composition according to any one of [1] to [4], the compatibilizer may be at least one kind selected from an amide compound, an aprotic polar solvent, polyhydric alcohol, saccharides, a polar resin, and inorganic salts.

According to a second aspect of the invention, there are provided the following hydrophilic treatment methods of [6] and [7].

[6] A hydrophilic treatment method including: treating a surface layer that contains an inorganic compound with a silane coupling agent that contains a radical reactive functional group; applying a hydrophilic treatment coating composition to the surface layer that is coupled with the silane coupling agent, the hydrophilic treatment coating composition containing a hydrophilic compound that contains a radical reactive functional group and an alkali metal salt of a sulfonic acid group, does not contain a hydrophilic portion at a site other than an end of a molecular chain, and does not contain a branched chain, a radical polymerization initiator, and a polar compatibilizer; and allowing the radical reactive functional group of the silane coupling agent and the radical reactive functional group of the hydrophilic compound to react with each other with a radical that occurs from the radical polymerization initiator due to light or heat.

Here, specifically, the hydrophilic portion represents a nonionic hydrophilic group such as ethylene oxide, a hydroxyl group, and an amino group, and the like.

The hydrophilic compound is the same as the hydrophilic compound described in [1], and is preferably an appropriate hydrophilic compound described in [1].

[7] A hydrophilic treatment method including treating a surface layer that contains an inorganic compound with a silane coupling agent that contains a radical reactive functional group; applying a hydrophilic treatment coating composition to the surface layer that is coupled with the silane coupling agent, the hydrophilic treatment coating composition containing a compound that contains a radical reactive functional group and a sulfonic acid group, does not contain a hydrophilic portion at a site other than an end of a molecular chain, and does not contain a branched chain, a radical polymerization initiator, and a polar compatibilizer; allowing the radical reactive functional group of the silane coupling agent and the radical reactive functional group of the compound to react with each other with a radical that occurs from the radical polymerization initiator due to light or heat; and allowing the sulfonic acid group of the compound to react with a hydroxide of an alkali metal to form sulphonate.

Specifically, the hydrophilic portion represents a nonionic hydrophilic group such as ethylene oxide, a hydroxyl group, and an amino group, and the like.

Here, the silane coupling agent has the radical reactive functional group. In the compound that reacts with the silane coupling agent, when one end of a molecular chain of the compound is set as a first end, and the other end is set as a second end, the compound has the radical reactive functional group at the first end of the molecular chain, and has the sulfonic acid group at the second end of the molecular chain. The compound does not contain a hydrophilic portion at a site other than the first end and the second end, and does not have a branched chain. That is, when the one end of the molecular chain of the compound is set as the first end, and the other end is set as the second end, the compound has the radical reactive functional group at the first end of the molecular chain, has the sulfonic acid group at the second end of the molecular chain, does not contain a hydrophilic portion other than the radical reactive functional group and the sulfonic acid group, and does not have the branched chain.

When the one end of the molecular chain of the compound is set as the first end, and the other end is set as the second end, it is preferable that the compound has the radical reactive functional group at the first end of the molecular chain, has the sulfonic acid group at the second end of the molecular chain, does not contain a hydrophilic portion at a portion other than the first end and the second end, that is, does not contain a hydrophilic portion other than the radical reactive functional group and the sulfonic acid group, and does not have a branched chain having 5 or more carbon atoms.

According to a third aspect of the invention, there are provided the following hydrophilic treatment coating compositions of [8] to [12].

[8] A hydrophilic treatment coating composition that allows a surface layer that contains an inorganic compound to react with a reactive functional group of a silane coupling agent after a treatment of the surface layer with the silane coupling agent that contains at least one reactive functional group selected from an isocyanate group, an epoxy group, an amino group, and a mercapto group. The composition contains: a hydrophilic compound which contains a functional group that is at least one selected from an amino group, a hydroxyl group, a mercapto group, and an epoxy group, and reacts with the reactive functional group of the silane coupling agent, and sulfonic acid or an alkali metal salt of the sulfonic acid group, and which does not contain a hydrophilic portion at a site other than an end of a molecular chain; and a polar compatibilizer.

The composition is a composition that hydrophilizes the surface layer that contains the inorganic compound after the treatment of the surface layer with the silane coupling agent having the reactive functional group.

Here, the meaning of "hydrophilic portion" is the same as in description of [1].

When one end of a molecular chain of the hydrophilic compound is set as a first end, and the other end of the molecular chain is set as a second end, the hydrophilic compound has the functional group that is at least one selected from the amino group, the hydroxyl group, the mercapto group, and the epoxy group, and reacts with the reactive functional group of the silane coupling agent at the first end of the molecular chain, and has the sulfonic acid group or the alkali metal salt of the sulfonic acid group at the second end of the molecular chain. The hydrophilic compound does not have a hydrophilic portion at a site other than the first end and the second end.

That is, when the one end of the molecular chain of the hydrophilic compound is set as the first end, and the other end is set as the second end, the hydrophilic compound has the functional group that reacts with the reactive functional group of the silane coupling agent at the first end of the molecular chain, and has the sulfonic acid group or the alkali metal salt of the sulfonic acid group at the second end of the molecular chain. The hydrophilic compound does not have a hydrophilic portion other than the functional group that reacts with the reactive functional group of the silane coupling agent, and the sulfonic acid group.

[9] A hydrophilic treatment coating composition that is allowed to react with a surface layer that contains an inorganic compound. The composition contains: a silane coupling agent that contains (a) at least one reactive functional group selected from an isocyanate group, an epoxy group, an amino group, and a mercapto group; (b) a hydrophilic compound which contains a functional group that is at least one selected from an amino group, a hydroxyl group, a mercapto group, and an epoxy group, and reacts with the reactive functional group of the silane coupling agent, and a sulfonic acid group or an alkali metal salt of the sulfonic acid group, and which does not contain a hydrophilic portion at a site other than an end of a molecular chain; and (c) a polar compatibilizer.

This composition is a composition that hydrophilizes the surface layer that contains the inorganic compound and is not treated with the silane coupling agent.

Here, the meaning of the "hydrophilic portion" is the same as in description of [1].

When one end of a molecular chain of the hydrophilic compound is set as a first end, and the other end is set as a second end, the hydrophilic compound has the functional group that is at least one selected the amino group, the hydroxyl group, the mercapto group, and the epoxy group, and reacts with the reactive functional group of the silane coupling agent at the first end of the molecular chain, and has the sulfonic acid group or the alkali metal salt of the sulfonic acid group at the second end of the molecular chain. The hydrophilic compound does not have a hydrophilic portion at a site other than the first end and the second end.

That is, when the one end of the molecular chain of the hydrophilic compound is set as the first end, and the other end is set as the second end, the hydrophilic compound has the functional group that reacts with the reactive functional group of the silane coupling agent at the first end of the molecular chain, and has the sulfonic acid group or the alkali metal salt of the sulfonic acid group at the second end of the molecular chain. The hydrophilic compound does not have a hydrophilic portion other than the functional group that reacts with the reactive functional group of the silane coupling agent, and the sulfonic acid group.

[10] The hydrophilic treatment coating composition according to [8] or [9] may further contain a reaction catalyst that promotes a reaction between the reactive functional group of the silane coupling agent and the functional group of the hydrophilic compound.

[11] In the hydrophilic treatment coating composition according to any one of [8] to [10], a number-average molecular weight of the hydrophilic compound may be 70 to 500.

[12] In the hydrophilic treatment coating composition according to any one of [8] to [11], the compatibilizer may be at least one kind selected from an amide compound, an aprotic polar solvent, polyhydric alcohol, saccharides, a polar resin, and inorganic salts.

According to a fourth aspect of the invention, there are provided the following hydrophilic treatment methods of [13] and [14].

[13] A hydrophilic treatment method including: treating a surface layer that contains an inorganic compound with a silane coupling agent that contains at least one reactive functional group selected from an isocyanate group, an epoxy group, an amino group, and a mercapto group; applying a hydrophilic treatment coating composition to a surface layer that is coupled with the silane coupling agent, the hydrophilic treatment coating composition containing a hydrophilic compound that contains a functional group that is at least one selected from an amino group, a hydroxyl group, and a mercapto group, and reacts with the reactive functional group of the silane coupling agent, and sulfonic acid or an alkali metal salt of the sulfonic acid group, and which does not contain a hydrophilic portion at a site other than an end of a molecular chain, and a polar compatibilizer; and allowing the reactive functional group of the silane coupling agent and the functional group of the hydrophilic compound to react with each other by heat.

Here, the meaning of the "hydrophilic portion" is the same as in description of [8].

The hydrophilic compound is the same as the hydrophilic compound described in [8], and is preferably an appropriate hydrophilic compound described in [8].

[14] A hydrophilic treatment method including: treating a surface layer that contains an inorganic compound with a silane coupling agent that contains at least one reactive functional group selected from an isocyanate group, an epoxy group, an amino group, and a mercapto group; applying a hydrophilic treatment coating composition to the surface layer that is coupled with the silane coupling agent, the hydrophilic treatment coating composition containing a hydrophilic compound that contains a functional group that is at least one selected from an amino group, a hydroxyl group, and a mercapto group, and reacts with the reactive functional group of the silane coupling agent, and a sulfonic acid group, and which does not contain a hydrophilic portion at a site other than an end of a molecular chain, and a polar compatibilizer; allowing the reactive functional group of the silane coupling agent and the functional group of the hydrophilic compound to react with each other with heat; and allowing the sulfonic acid group of the hydrophilic compound to react with a hydroxide of an alkali metal to form sulphonate.

Here, the meaning of the "hydrophilic portion" is the same as in the description of [8].

When one end of a molecular chain of the hydrophilic compound is set as a first end, and the other end is set as a second end, the hydrophilic compound has the functional group that is at least one selected the amino group, the hydroxyl group, and the mercapto group, and reacts with the reactive functional group of the silane coupling agent at the first end of the molecular chain, and has the sulfonic acid group at the second end of the molecular chain. The hydrophilic compound does not have a hydrophilic portion at a site other than the first end and the second end.

That is, when the one end of the molecular chain of the hydrophilic compound is set as the first end, and the other end is set as the second end, the hydrophilic compound has the functional group that reacts with the reactive functional group of the silane coupling agent at the first end of the molecular chain, and has the sulfonic acid group at the second end of the molecular chain. The hydrophilic compound does not have a hydrophilic portion other than the functional group that reacts with the reactive functional group of the silane coupling agent, and the sulfonic acid group.

Advantageous Effects of Invention

According to the aspects of the invention, it is possible to reduce the number of washing times by preventing an inorganic material such as calcium from being settled to crockery such as toilet bowl and a washstand which are installed in a water-using site in a building and contains an inorganic compound such as silicon oxide, and by making washing of an oily contaminant, which becomes a cause for propagation of a fungi and an offensive odor, easy.

DESCRIPTION OF EMBODIMENTS

<First Aspect and Second Aspect>

Hereinafter, detailed description will be given of an embodiment of a hydrophilic treatment coating composition and a hydrophilic treatment method according to a first aspect and a second aspect of the invention. Furthermore, expressions indicating a range of a quantity include an upper limit and a lower limit.

Typically, with regard to crockery such as a toilet bowl and a washstand which are installed at a water-using site in a building, the following surface treatment is performed. Specifically, glaze such as ash glaze is applied to a surface of unglazed crockery, and firing is performed to form a vitreous layer on the surface of the crockery. When the surface treatment with the glaze is performed, a plurality of silicon oxides, which are inorganic compounds, exist on the surface layer, and thus a plurality of silanol groups also exist.

In a previous step of application of the hydrophilic treatment coating composition of the first aspect of the invention, a primer layer, which is obtained by treating the surface layer of crockery with a silane coupling agent that contains a radical reactive functional group, may be provided. The primer layer is located between the surface layer of the crockery and the hydrophilic treatment coating composition of the first aspect of the invention, and functions as a binder that couples a part of the hydrophilic treatment coating composition of the first aspect of the invention to the surface layer of the crockery.

Preferred examples of the radical reactive functional group in the silane coupling agent that contains the radical reactive functional group include an acryloyl group, a methacryloyl group, a vinyl group, an allyl group, a styryl group, and a mercapto group. As specific examples of the silane coupling agent, 3-acryloxypropyltrimethoxysilane, vinyltrimethoxysilane, vinyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-mercaptopropylmethyldimethoxysilane, 3-mercaptopropyltrimethoxysilane, and the like. In addition, as a hydrolyzable group that is coupled to a silicon atom, in addition to the alkoxy group such as the methoxy group and the ethoxy group, a 2-methoxyethoxyl group ($CH_3OCH_2CH_2$—O—) may be provided. As a commercially available product thereof, KBM-5103, KBM-1003, KBE-1003, KBM-1403, KBM-502, KBM-503, KBE-502, KBE-503, KBM-802, and KBM-803 which are manufactured by Shin-Etsu Chemical Co., Ltd., and the like can be used.

The alkoxy silane of the silane coupling agent that contains the radical reactive functional group is hydrolyzed, and a silanol group that is generated is subjected to a dehydration and condensation reaction with a silanol group that exists on the surface layer of crockery. At this time, preferred examples of a catalyst that hydrolyzes the alkoxy silane include an acidic catalyst such as an aqueous hydrochloric acid solution, an aqueous sulfuric acid solution, an aqueous nitric acid solution, an aqueous phosphoric acid solution, and an aqueous solution of a compound having a carboxylic acid such as formic acid, acetic acid and propionic acid, a basic catalyst such as an aqueous ammonia solution, morpholine, N-methylmorpholine, N-ethylmorpholine, piperazine, hydroxyethylpiperazine, 2-methylpiperazine, trans 2,5-dimethylpiperazine, cis 2,6-dimethylpiperazine, triethylamine, N,N-dimethyl ethanolamine, N,N-diethylethanolamine, N-(β-aminoethyl)ethanolamine, N-methyldiethanolamine, N-n-butylethanolamine, N-n-butyldiethanolamine, N-t-butylethanolamine, N-t-butyldiethanolamine, N-(β-aminoethyl)isopropanolamine, N,N-diethylisopropanolamine, 2-amino-2-methyl-1-propanol, an aqueous sodium hydroxide solution, and an aqueous potassium hydroxide solution.

In addition, as a solvent of a composition that is used to form the primer layer, for example, the following organic solvents and water are preferable. Examples of the organic solvents include alcohols such as methanol, ethanol, isopropyl alcohol, n-propyl alcohol, and 1-methoxy-2-propanol, ketones such as methylethylketone and methylisobutylketone, and esters such as ethyl acetate.

In the composition that is used to form the primer layer, it is preferable that a blending amount of the silane coupling agent that contains the radical reactive functional group with respect to a total weight of the composition is 0.01 to 10% by weight, more preferably 0.05 to 5% by weight, and still more preferably 0.1 to 2% by weight. When the blending amount of the silane coupling agent that contains the radical reactive functional group is less than 0.01% by weight, the primer layer is not sufficiently formed, and a hydrophilic compound that is subsequently coupled to the silane coupling agent decreases, and thus hydrophilicity decreases. In addition, when the blending amount of the silane coupling agent that contains the radical reactive functional group is greater than 10% by weight, the coupling agent is subjected to a condensation reaction, and thus gelation occurs, or unevenness occurs in the primer layer.

Specifically, the primer layer is formed as follows as an example.

(Primer Layer 1A)

0.5 parts by weight of 3-acryloxypropyltrimethoxysilane, and 99 parts by weight of 1-methoxy-2-propanol are stirred and mixed at room temperature, and 0.5 parts by weight of 3% hydrochloric acid aqueous solution is added to the resultant mixture. Then, the resultant mixture is stirred for 30 minutes for hydrolysis. A solution that is obtained is applied to the surface layer of crockery, and the crockery is left stationary at 60° C. for 30 minutes by using an electric oven to volatilize a solvent and the like by using heat, and to subject a silanol group generated from the 3-acryloxypropyltrimethoxysilane and a silanol group of the surface layer of the crockery to a dehydration and condensation reaction, thereby obtaining the primer layer.

(Primer Layer 2A)

0.5 parts by weight of vinyltrimethoxysilane, and 99 parts by weight of 1-methoxy-2-propanol are stirred and mixed at room temperature, and then 0.5 parts by weight of 3% hydrochloric acid aqueous solution is added to the resultant mixture. Then, the resultant mixture is stirred for 30 minutes for hydrolysis. A solution that is obtained is applied to the surface layer of the crockery, and the crockery is left stationary at 60° C. for 30 minutes by using an electric oven to volatilize a solvent and the like by using heat, and to subject a silanol group generated from the vinylmethoxysilane and a silanol group of the surface layer of the crockery to a dehydration and condensation reaction, thereby obtaining the primer layer.

(Primer Layer 3A)

0.5 parts by weight of p-styryltrimethoxysilane, and 99 parts by weight of 1-methoxy-2-propanol are stirred and mixed at room temperature, and then 0.5 parts by weight of 3% hydrochloric acid aqueous solution is added to the resultant mixture. Then, the resultant mixture is stirred for 30 minutes for hydrolysis. A solution that is obtained is applied to the surface layer of the crockery, and the crockery is left stationary at 60° C. for 30 minutes by using an electric oven to volatilize a solvent and the like by using heat, and to subject a silanol group generated from the p-styryltrimethoxysilane and a silanol group of the surface layer of the crockery to a dehydration and condensation reaction, thereby obtaining the primer layer.

(Primer Layer 4A)

0.5 parts by weight of 3-methacryloxypropyltrimethoxysilane, and 99 parts by weight of 1-methoxy-2-propanol are stirred and mixed at room temperature, and then 0.5 parts by weight of 3% hydrochloric acid aqueous solution is added to the resultant mixture. Then, the resultant mixture is stirred for 30 minutes for hydrolysis. A solution that is obtained is applied to the surface layer of the crockery, and the crockery is left stationary at 60° C. for 30 minutes by using an electric oven to volatilize a solvent and the like by using heat, and to subject a silanol group generated from the 3-methacryloxypropyltrimethoxysilane and a silanol group of the surface layer of the crockery to a dehydration and condensation reaction, thereby obtaining the primer layer.

(Primer Layer 5A)

0.5 parts by weight of 3-mercaptopropyltrimethoxysilane, and 99 parts by weight of 1-methoxy-2-propanol are stirred and mixed at room temperature, and then 0.5 parts by weight of 3% hydrochloric acid aqueous solution is added to the resultant mixture. Then, the resultant mixture is stirred for 30 minutes for hydrolysis. A solution that is obtained is applied to the surface layer of the crockery, and the crockery is left stationary at 60° C. for 30 minutes by using an electric oven to volatilize a solvent and the like by using heat, and to subject a silanol group generated from the 3-mercaptopropyltrimethoxysilane and a silanol group of the surface layer of the crockery to a dehydration and condensation reaction, thereby obtaining the primer layer.

With respect to each of the primer layers obtained as described above, the following surface treatment is performed. In the surface treatment, the hydrophilic treatment coating composition of the first aspect of the invention is subjected to a reaction with the primer layer by using ultraviolet rays or heat. The hydrophilic treatment coating composition contains a hydrophilic compound (A) that contains a radical reactive functional group, and an alkali metal salt of a sulfonic acid group, does not contain a hydrophilic portion at a site other than an end of a molecular chain, and does not contains a branched chain, a radical polymerization initiator, and a polar compatibilizer.

Here, "does not contain a branched chain" represents that the hydrophilic compound (A) does not have a branched chain having 5 or more carbon atoms, and preferably does not have a branched chain having 3 or more carbon atoms. However, the hydrophilic compound (A) may have a branched chain having 2 or less carbon atoms. That is, in the invention, a side chain having 2 or less carbon atoms is not included in (is not classified to) the branched chain. If the hydrophilic compound (A) has a branched chain having 5 or more carbon atoms, a hydrophilic portion is less likely to concentrate on the surface, and thus sufficient washability is not exhibited.

The hydrophilic compound (A) has a radical reactive functional group that reacts with the radical reactive functional group of the silane coupling agent at one end, and the alkali metal salt of the sulfonic acid group at the other end, does not have a hydrophilic group at a site other than the end of the molecular chain, and does not have a branched chain.

In this structure, the hydrophilic group of the hydrophilic compound (A) is allowed to concentrate on a surface of a coated film, and thus even when being used in crockery such as a toilet bowl and a washstand which are frequently washed with water, it is possible to provide sufficient washability.

Preferred examples of the radical reactive functional group at the one end of the hydrophilic compound (A) include an acryloyl group, a methacryloyl group, a vinyl group, an allyl group, a styryl group, a mercapto group, and the like. Preferred examples of the alkali metal salt of the sulfonic acid group at the other end include a sodium salt and a potassium salt. Preferred specific examples of the hydrophilic compound (A) include sodium N-t-butyl acrylamide sulfonate, sodium vinyl sulfonate, 2-sodium sulfoethyl methacrylate, sodium allyl sulfonate, sodium p-styrene sulfonate, sodium 3-mercapto-1-propane sulfonate, and the like. With regard to properties of the hydrophilic compound (A), a solid substance, an aqueous solution, and the like can be used. As a commercially available product of the hydrophilic compound (A), ATBS (registered trademark)-Na manufactured by Toagosei Co., Ltd., N-SVS-25 manufactured by Asahi Kasei Finechem Co., Ltd., Antox MS-2N manufactured by Nippon Nyukazai Co., LTd., Spinomar (registered trademark) NaSS manufactured by Tosoh Organic Chemical Co., Ltd., and the like can be used. In addition, in addition to the commercially available product, the hydrophilic compound (A) can be synthesized. For example, a hydrophilic compound, which is obtained by synthesizing sodium sulfonate-containing urethane acrylate, potassium N-t-butyl acrylamide sulfonate, and the like, can be used.

For example, the sodium sulfonate-containing urethane acrylate can be synthesized as follows.

Synthesis Example 1

45.2 parts by weight of aminoethyl sulfonate, 14.8 parts by weight of sodium hydroxide, and 40 parts by ion exchanged water are allowed to react with each other at room temperature of 20 to 25° C. 42.5 parts by weight of the resultant solution is maintained at a temperature of 5 to 10° C., and a solution, which is obtained by mixing and dissolving 24.5 parts by weight of 2-isocyanatoethyl acrylate (Karenz AOI (registered trademark)) manufactured by Showa Denko K. K. in 33 parts by weight of 1-methoxy-2-propanol, is added dropwise to the resultant solution for 5 minutes. Then, the resultant solution is stirred for 4 hours for synthesis. From the infrared absorption spectrum, it is confirmed that reaction is terminated without recognition of absorption derived from an isocyanate group.

In addition, for example, the potassium N-t-butyl acrylamide sulfonate can be synthesized as follows.

Synthesis Example 2

49.1 parts by weight of ion exchanged water, 40.0 parts by weight of N-t-butylacrylamide sulfonic acid (ATBS (registered trademark), manufactured by Toagosei Co., Ltd.), and 10.9 parts by weight of potassium hydroxide are mixed, and the resultant mixture is stirred at room temperature of 20 to 25° C. for 1 hour for synthesis. Termination of a reaction is confirmed when pH reaches a neutral region.

It is preferable that a number-average molecular weight of the hydrophilic compound (A) is 70 to 500, and more preferably 130 to 400. When the number-average molecular weight of the hydrophilic compound (A) is less than 70, it is difficult for an existing raw material to contain a radical reactive functional group and an alkali metal salt of a sulfonic acid group, and thus it is difficult to form a hydrophilic coated film. When the number-average molecular weight of the hydrophilic compound (A) is greater than 500, the amount of a sulfonic acid metal salt in the coated film decreases, and thus the hydrophilicity becomes deficient.

In addition, the following treatment may be performed with respect to the radical reactive functional group of the primer layer. Specifically, the radical reactive functional group is allowed to react with a compound such as N-t-butylacrylamide sulfonic acid that has a radical reactive functional group at one end and sulfonic acid at the other end, does not have a hydrophilic portion at a site other than an end of a molecular chain, and does not have a branched chain so as to form a carbon-carbon bond. Then, neutralization is performed with an aqueous hydroxide solution of an alkali metal such as sodium hydroxide and potassium hydroxide so as to form a sulfonate.

A solvent may be added to the hydrophilic treatment coating composition of the first aspect of the invention so as to dissolve or disperse the hydrophilic compound (A). Preferred examples of the solvent include water, methanol, ethanol, isopropyl alcohol, n-propyl alcohol, and the like. It is preferable to adjust a solid content concentration of the hydrophilic compound (A) with respect to a total weight of the composition to 0.1 to 60% by weight through addition of the solvent. When the solid content concentration of the hydrophilic compound (A) is less than 0.1% by weight, a hydrophilic group in a coated film that is formed decreases, and thus hydrophilicity decreases. In addition, when the solid content concentration of the hydrophilic compound (A) is greater than 60% by weight, it is difficult to uniformly mix the solvent that dissolves or disperses the hydrophilic compound (A), the radical polymerization initiator, and the polar compatibilizer, and thus constant hydrophilicity is not provided.

The radical polymerization initiator is a compound that is decomposed with light or heat to generate a radical. The radical polymerization initiator is classified into an optical radical polymerization initiator that is decomposed with light, and a thermal radical polymerization initiator that is decomposed with heat. It is preferable that the radical polymerization initiator is soluble in water.

Preferred examples of the optical radical polymerization initiator include benzophenone, 1-hydroxy-cyclohexyl-phenyl-ketone, a mixture of 1-hydroxy-cyclohexyl-phenyl-ketone and benzophenone, 1-[4-(2-hydroxyethoxy)-phenyl]-2-hydroxy-2-methyl-1-propane-1-one, 2-hydroxy-2-methyl-1-phenyl-propane-1-one, 2-hydroxy-1-[4-{4-(2-hydroxy-2-methyl-propionyl)-benzyl}phenyl]-2-methyl-1-propane-1-one, oxy-phenyl acetate, a mixture of 2-[2-oxo-2-phenylacetoxyethoxy]ethyl ester, oxy-phenyl acetate, and 2-(2-hydroxyethoxy)ethyl ester, bis(2,4,6-trimethylbenzoyl)-phenylphosphine oxide, and the like. In addition, a sensitizer such as p-dimethyl amino benzoic acid ethyl (KAYACURE EPA, manufactured by Nippon Kayaku Co., Ltd.) may be added to the optical radical polymerization initiator as necessary. As a commercially available product of the optical radical polymerization initiator, for example, IRGACURE (registered trademark) 184, IRGACURE (registered trademark) 500, IRGACURE (registered trademark) 2959, DAROCURE (registered trademark) 1173, IRGACURE (registered trademark) 127, IRGACURE (registered trademark) 754, and IRGACURE (registered trademark) 819DW which are manufactured by BASF, and the like can be used.

As the thermal radical polymerization initiator, for example, an azo-based compound such as 2,2'-azobis[2-(2-imidazolin-2-yl)propane]dihydrochloride, 2,2'-azobis[2-(2-imidazolin-2-yl)propane]disulfate dihydrate, 2,2'-azobis[2-(2-imidazolin-2-yl)propane], 2,2'-azobis(propan-2-carboamidine)dihydrochloride, 2,2'-azobis [N-(2-carboxyethyl)-2-methylpropionamidine]n-hydrate, 2,2'-azobis[2-methyl-N-(2-hydroxyethyl)propionamide], and 4,4'-azobis(4-cyanopentanoic acid), sodium persulfate such as ammonium persulfate, sodium persulfate, and potassium persulfate, peroxide such as hydrogen peroxide, cumyl perneodecanoate, 1,1,3,3-tetramethylbutyl peroxyneodecanoate, t-hexylperoxy neodecanoate, t-butyl peroxy neodecanoate, t-hexyl peroxy pivalate, and t-butyl peroxy pivalate, and the like are preferable. In addition, water and the like may be added to the thermal radical polymerization initiator as necessary. As a commercially available product thereof, for example, VA-044, VA-046B, VA-061, V-50, VA-057, VA-086, and V-501 which are manufactured by Wako Pure Chemical Industries, Ltd., Percumyl ND-50E, Perocta ND-50E, Perhexyl ND-50E, Perbutyl ND-50E, perhexyl PV-50E, Perbutyl PV-40E which are manufactured by NOF CORPORATION, and reagents of respective companies and the like can be used.

It is preferable that a blending amount of the radical polymerization initiator is 0.1 to 50% by weight with respect to the solid content weight (100% by weight) of the hydrophilic compound (A), and more preferably 1 to 20% by weight. When the blending amount of the radical polymerization initiator is less than 0.1% by weight, radicals are generated in a small amount, and thus it is difficult for the radical reactive functional group of the hydrophilic compound (A) to sufficiently react with the radical. As a result, hydrophilic groups are present in the coated film that is formed in a small amount, and thus hydrophilicity decreases. In addition, when the blending amount of the radical polymerization initiator is greater than 50% by weight, the radicals are excessively generated, and thus the molecular weight decreases. As a result, hydrophilicity of the coated film that is formed decreases.

Typically, when manufacturing a composition by using the hydrophilic compound (A) that does not contain a hydrophilic portion at a site other than an end of a molecular chain, and does not contain a branched chain without using the compatibilizer, components of the composition are crystallized, and thus a coated film is not uniform. Therefore, hydrophilicity of a coated film that is formed may not be sufficient, or unevenness may occur. On the other hand, when the compatibilizer is blended to the composition, crystallization of the hydrophilic compound (A), which does not contain a hydrophilic portion at a site other than an end of a molecular chain, and does not contain a branched chain, is suppressed, and thus it is possible to obtain a uniform coated film.

Preferred examples of the compatibilizer include an amide compound such as urea, melamine, acryloyl morpholine, dimethyl acrylamide, dimethylaminopropyl acrylamide, isopropyl acrylamide, diethyl acrylamide, and hydroxyethyl acrylamide, aprotic polar solvents such as dimethyl sulfoxide, acetonitrile, and N,N-dimethylformamide, polyhydric alcohol such as ethylene glycol, glycerin, trimethylolpropane, ditrimethylolpropane, erythritol, erythritol, and dipentaerythritol, saccharides such as triose, tetrose, pentose, hexose, sedoheptulose, glucose, maltose, sucrose, lactose, cellobiose, raffinose, acarbose, oligosaccharides, cyclodextrin, dextrin, and starch, a polar resin such as sodium carboxymethyl cellulose, polyvinyl pyrrolidone, sodium polyacrylate, and modified urea, and inorganic salts such as sodium hydrogen carbonate, sodium carbonate, sodium hydrogen sulfate, and sodium sulfate. As a commercially available product thereof, reagents of respective companies can be used. With regard to the resin, for example, Cellogen WS-C, Pitts call K-30L, Shallol DC-902P, and Shallol DC-303P Shallol which are manufactured by Dai-ichi Kogyo Seiyaku Co., Ltd., BYKETOL-PC manufactured by BYK Japan KK., and the like can be used. In addition, one or more kinds of the compatibilizers may be mixed and used.

For example, an aqueous solution of the sodium carboxymethyl cellulose may be adjusted as follows.

Adjustment Example 1

30.0 parts by weight of sodium carboxylmethyl cellulose (100 wt % solid content, Cellogen WS-C manufactured by Dai-ichi Kogyo Seiyaku Co., Ltd.) is stirred and dissolved in 70 parts by weight of ion exchanged water at a liquid temperature of 20 to 25° C. for 24 hours.

It is preferable that a blending amount of the compatibilizer is 10 to 200% by weight with respect to the solid content weight (100% by weight) of the hydrophilic compound, and more preferably 30 to 120% by weight. When the blending amount of the compatibilizer is less than 10% by weight, the hydrophilic compound is crystallized and powderized, and thus a reaction rate decreases. As a result, hydrophilicity of a coated film that is formed decreases. When the blending amount of the compatibilizer is greater than 200% by weight, a concentration of the hydrophilic compound is relatively lowered, and thus a reaction rate decreases. As a result, hydrophilicity of a coated film that is formed decreases.

The hydrophilic treatment coating composition of the first aspect of the invention may further contain other additives in addition to the above-described components. As the other additives, a surface conditioner, a leveling agent, a plasticizer, an antifoaming agent, an ultraviolet absorbing agent, an antioxidant, a viscosity modifier, and the like can be used. In addition, the additives can be used in combination of two or more kinds.

In the second aspect of the invention, ultraviolet rays or heat is used so as to allow the hydrophilic treatment coating composition of the first aspect of the invention and the primer layer to react with each other. As an ultraviolet ray irradiation apparatus, for example, a high-pressure mercury lamp, a metal halide lamp, an ultraviolet LED (UV-LED) lamp having a light-emitting wavelength in which a peak wavelength is 405 nm or less, and the like may be used alone or in combination of a plurality of kinds thereof. The amount of ultraviolet rays required for radical polymerization with ultraviolet rays is measured by using an integral actinometer. In addition, as an apparatus that generates heat, an electric oven, a hot air drier, an infrared ray irradiation apparatus, and the like can be used.

Components, which remain on the coated film formed through reaction between the hydrophilic treatment coating composition of the first aspect of the invention and the primer layer without reacting with the primer layer, are washed with water and the like, and the hydrophilic treatment of the second aspect of the invention is terminated.

In the second aspect of the invention, the primer layer may not be provided in advance. As a composition that is allowed to react with a surface layer, which contains an inorganic compound, of crockery and the like, a hydrophilic treatment coating composition, which contains the silane coupling agent, the hydrophilic compound, and the compatibilizer, may be used. According to a method of using this composition, it is possible to perform a primer treatment process with the silane coupling agent, and a hydrophilic treatment process of allowing the hydrophilic compound to react with the silane coupling agent at once. Accordingly, for example, when using the composition with respect to crockery such as a toilet bowl and a washstand which are installed already in house or office, it is possible to shorten working time at an installation site of the crockery.

In the second aspect of the invention, a first liquid that contains the silane coupling agent and the like, and a second liquid that contains the hydrophilic compound (A), the compatibilizer, and the like may be separately prepared. Immediately before performing work with respect to the surface layer, the first liquid and the second liquid may be mixed and used. When the first liquid and the second liquid are separately prepared in advance, it is possible to suppress hydrolysis of the silane coupling agent due to a catalytic operation of the functional group of the hydrophilic compound (A) during storage before use. Accordingly, it is possible to suppress a decrease in reactivity with the surface layer due to dehydration and condensation between silanol groups which are generated during storage, and it is possible to prevent particulates from being generated. In addition, the second liquid may contain a catalyst that promotes hydrolysis of the silane coupling agent in alkoxy silane.

<Third Aspect and Fourth Aspect>

Hereinafter, detailed description will be given of an embodiment pertaining to a hydrophilic treatment coating composition and a hydrophilic treatment method according to a third aspect and a fourth aspect of the invention. Furthermore, expressions indicating a range of a quantity include an upper limit and a lower limit.

In a previous step of application of the hydrophilic treatment coating composition of the third aspect of the invention, a primer layer, which is obtained by treating the surface layer of crockery with a silane coupling agent that contains at least one reactive functional group selected from an isocyanate group, an epoxy group, an amino group, and a mercapto group, may be provided. The primer layer is located between the surface layer of the crockery and the hydrophilic treatment coating composition of the third aspect of the invention, and functions as a binder that couples a part of the hydrophilic treatment coating composition of the third aspect of the invention to the surface layer of the crockery.

Preferred specific examples of the silane coupling agent that contains at least one reactive functional group selected from the isocyanate group, the epoxy group, the amino group, and the mercapto group include 3-isocyanatopropyltrimethoxysilane, 3-isocyanatopropyltriethoxysilane, 2-(3, 4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, N-2-(aminoethyl)-3-aminopropylmethyldimetoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, a hydrochloride of N-(vinylbenzyl)-2-aminoethyl-3-aminopropyltrimethoxysilane, 3-mercaptopropylmethyldimethoxysilane, 3-mercaptopropyltrimethoxysilane, and the like. In addition, as a hydrolyzable group that is coupled to a silicon atom, in addition to the alkoxy group such as the methoxy group and the ethoxy group, a 2-methoxyethoxyl group ($CH_3OCH_2CH_2$—O—) may be provided. As a commercially available product of the silane coupling agent, KBE-9007, KBM-303, KBM-402, KBM-403, KBE-402, KBE-403, KBM-602, KBM-603, KBM-903, KBE-903, KBE-9103, KBM-573, KBM-575, KBM-802, and KBM-803 which are manufactured by Shin-Etsu Chemical Co., Ltd., Y-5187 manufactured by Momentive Performance Materials Inc., and the like can be used.

The alkoxy silane of the silane coupling agent is hydrolyzed, and a silanol group that is generated is subjected to a dehydration and condensation reaction with a silanol group that exists on the surface layer of the crockery. At this time, as a catalyst that hydrolyzes the alkoxy silane, for example, catalysts which are exemplified in the first aspect are preferable.

In addition, as a solvent of a composition that is used to form the primer layer, the solvents which are exemplified in the first aspect are preferable.

In the composition that is used to form the primer layer, it is preferable that a blending amount of the silane coupling agent with respect to a total weight of the composition is 0.01 to 10% by weight, more preferably 0.05 to 5% by weight, and still more preferably 0.1 to 2% by weight. When the blending amount of the silane coupling agent is less than 0.01% by weight, the primer layer is not sufficiently formed, and a hydrophilic compound that is subsequently coupled to the silane coupling agent decreases, and thus hydrophilicity decreases. In addition, when the blending amount of the silane coupling agent is greater than 10% by weight, the coupling agent is subjected to a condensation reaction, and thus gelation occurs, or unevenness occurs in the primer layer.

Specifically, the primer layer is formed as follows as an example.

(Primer Layer 1B)

0.5 parts by weight of 3-isocyanatopropyltrimethoxysilane, and 99 parts by weight of 1-methoxy-2-propanol are stirred and mixed at room temperature, and then 0.5 parts by weight of 3% hydrochloric acid aqueous solution is added to the resultant mixture. Then, the resultant mixture is stirred for 30 minutes for hydrolysis. A solution that is obtained is applied to a surface layer of crockery that is degreased with methanol in advance, and the crockery is left stationary at 60° C. for 30 minutes by using an electric oven to volatilize a solvent and the like by using heat, and to subject a silanol group generated from the 3-isocyanatopropyltrimethoxysilane and a silanol group of the surface layer of the crockery to a dehydration and condensation reaction, thereby obtaining the primer layer.

(Primer Layer 2B)

0.5 parts by weight of 3-glycidoxypropyltrimethoxysilane, and 99 parts by weight of 1-methoxy-2-propanol are stirred and mixed at room temperature, and then 0.5 parts by weight of 3% hydrochloric acid aqueous solution is added to the resultant mixture. Then, the resultant mixture is stirred for 30 minutes for hydrolysis. A solution that is obtained is applied to a surface layer of crockery, and the crockery is left stationary at 60° C. for 30 minutes by using an electric oven to volatilize a solvent and the like by using heat, and to subject a silanol group generated from the vinylmethoxysilane and a silanol group of the surface layer of the crockery to a dehydration and condensation reaction, thereby obtaining the primer layer.

With respect to the primer layer obtained as described above, the following surface treatment is performed. In the surface treatment, the hydrophilic treatment coating composition of the third aspect of the invention is subjected to a reaction with the primer layer. The hydrophilic treatment coating composition contains: a hydrophilic compound (B) which contains a functional group that is at least one selected from an amino group, a hydroxyl group, a mercapto group, and an epoxy group, and reacts with the reactive functional group of the silane coupling agent, and an alkali metal salt of a sulfonic acid group, and which does not contain a hydrophilic portion at a site other than an end of a molecular chain; and a polar compatibilizer.

The hydrophilic compound (B) has at least one functional group, which is selected from an amino group, a hydroxyl group, a mercapto group, and an epoxy group, and reacts with at least one reactive functional group selected from an isocyanate group, an epoxy group, an amino group, and a mercapto group of the silane coupling agent, at one end, and sulfonic acid or an alkali metal salt of a sulfonic acid group at the other end, and does not have a hydrophilic group at a site other than an end of a molecular chain. In this structure, the hydrophilic group of the hydrophilic compound (B) is allowed to concentrate on a surface of a coated film, and thus even when being used in crockery such as a toilet bowl and a washstand which are frequently washed with water, it is possible to provide sufficient washability. In addition, it is more preferable that the hydrophilic compound (B) does not have a branched chain so as to allow the hydrophilic group to orient in a specific direction.

Here, it is preferable that the hydrophilic compound (B) does not have a branched chain having 5 or more carbon atoms. More preferably, the hydrophilic compound (B) does not have a branched chain having 3 or more carbon atoms. However, the hydrophilic compound (B) may have a branched chain having 2 or less carbon atoms. That is, in the invention, a side chain having 2 or less carbon atoms is not included in (is not classified to) the branched chain. If the hydrophilic compound (B) has a branched chain having 5 or more carbon atoms, a hydrophilic portion is less likely to concentrate on the surface, and thus sufficient washability may not be exhibited.

As the alkali metal salt of the sulfonic acid group which exists at the other end of the hydrophilic compound (B), for example, a sodium salt and a potassium salt are preferable. Preferred specific examples of the hydrophilic compound (B) include sodium 2-aminoethyl sulfonate, potassium 2-aminoethyl sulfonate, sodium 4-aminobenzene sulfonate, sodium 2-hydroxyethyl sulfonate, sodium 3-mercapto-1-propane sulfonate, sodium 2-glycidylethyl sulfonate, sodium aminosulfonate, potassium aminosulfonate, amine methane sulfonic acid, 3-aminopropane sulfonic acid, 2-aminobenzenesulfonic acid, 4-aminobenzene sulfonic acid, sodium hydroxy methane sulfonate, 4-hydroxy-1-butane sulfonic acid, and the like. With regard to properties of the hydrophilic compound (B), a solid substance, an aqueous solution, and the like can be used. The above-described various sulfonic acids may be subjected to a neutralization reaction with sodium hydroxide, potassium hydroxide, and the like for synthesis, and the resultant product may be used.

For example, the sodium 2-aminoethyl sulfonate can be synthesized as follows.

Synthesis Example 3

37.9 parts by weight of 2-aminoethyl sulfonate, 12.1 parts by weight of sodium hydroxide, 50.2 parts by weight of ion exchanged water are stirred at room temperature of 20 to 25° C. for 1 hours for synthesis. Termination of a reaction is confirmed when pH reaches a neutral region.

In addition, with regard to potassium 2-aminoethyl sulfonate, sodium 4-aminobenzene sulfonate, sodium 2-hydroxyethyl sulfonate, sodium 3-mercapto-1-propane sulfonate, sodium 2-glycidylethyl sulfonate, and the like, synthesis can be performed in the same manner as in Synthesis Example 3.

It is preferable that number-average molecular weight of the hydrophilic compound (B) is 70 to 500, and more preferably 100 to 400. When the number-average molecular weight of the hydrophilic compound (B) is less than 70, it is difficult for the hydrophilic compound (B) to contain at least one functional group selected from an amino group, a hydroxyl group, a mercapto group, and an epoxy group, and an alkali metal salt of the sulfonic acid group, and it is difficult to form a hydrophilic coated film. When the number-average molecular weight of the hydrophilic compound (B) is greater than 500, a reaction rate decreases due to steric hindrance, and the amount of hydrophilic groups decreases. As a result, hydrophilicity of the coated film decreases.

In addition, the following treatment may be performed with respect to at least one reactive functional group selected from an isocyanate group, an epoxy group, an amino group, and a mercapto group of the primer layer. Specifically, the reactive functional group is allowed to react with a compound such as 2-aminoethyl sulfonic acid that has at least one functional group selected from an amino group, a hydroxyl group, a mercapto group, and epoxy group at one end, has sulfonic acid at the other end, and does not have a hydrophilic portion at a portion other than an end of a molecular chain. Then, neutralization is performed with an aqueous hydroxide solution of an alkali metal such as sodium hydroxide and potassium hydroxide so as to form a sulfonate.

A solvent may be added to the hydrophilic treatment coating composition of the third aspect of the invention so as to dissolve or disperse the hydrophilic compound (B). Preferred examples of the solvent include water, methanol, ethanol, isopropyl alcohol, n-propyl alcohol, and the like. It is preferable to adjust a solid content concentration of the hydrophilic compound (B) with respect to a total weight of the composition to 0.1 to 60% by weight through addition of the solvent. When the solid content concentration of the hydrophilic compound (B) is less than 0.1% by weight, the number of hydrophilic groups in a coated film that is formed decreases, and thus hydrophilicity decreases. In addition, when the solid content concentration of the hydrophilic compound (B) is greater than 60% by weight, it is difficult to uniformly mix the solvent that dissolves or disperses the hydrophilic compound (B), and the polar compatibilizer, and thus constant hydrophilicity is not provided.

The polar compatibilizer is a material that can uniformly dissolve the hydrophilic compound (B) without crystallization of the hydrophilic compound (B). Typically, when manufacturing a composition by using the hydrophilic compound (B) that does not contain a hydrophilic portion at a site other than an end of a molecular chain without using the compatibilizer, components of the composition are crystallized, and thus a composition is not uniform. Therefore, hydrophilicity of a coated film that is formed may not be sufficient, or unevenness may occur. On the other hand, when the compatibilizer is blended to the composition, crystallization of the hydrophilic compound (B), which does not contain a hydrophilic portion at a site other than an end of a molecular chain, is suppressed, and thus it is possible to obtain a composition that is uniformly dissolved.

As the compatibilizer, for example, the compatibilizers exemplified in the first aspect are preferable.

It is preferable that the blending amount of the compatibilizer is 10 to 200% by weight with respect to a solid-content weight (100% by weight) of the hydrophilic compound, and more preferably 30 to 120% by weight. When the blending amount of the compatibilizer is less than 10% by weight, the hydrophilic compound is crystallized and powderized, and thus a reaction rate decreases. As a result, hydrophilicity of a coated film that is formed decreases. When the blending amount of the compatibilizer is greater than 200% by weight, a concentration of the hydrophilic compound is relatively lowered, and thus a reaction rate decreases. As a result, hydrophilicity of a coated film that is formed decreases.

In addition, a reaction catalyst may be blended to the hydrophilic treatment coating composition of the third aspect of the invention so as to promote a reaction between the silane coupling agent and the hydrophilic compound (B). For example, when allowing a silane coupling agent having an isocyanate group and a hydrophilic compound having a hydroxyl group to react with each other, it is preferable to use an organic tin catalyst such as tin dibutyl dilaurate. In addition, when allowing a silane coupling agent having a glycidyl group and a hydrophilic compound having a hydroxyl group or a mercapto group to react with each other, it is preferable to use a compound such as N,N-dimethylbenzylamine, triphenylphosphine, and 1,8-diazabicyclo(5,4,0)undesen-7, 2-heptadecylimidazole.

The hydrophilic treatment coating composition of the third aspect of the invention may contain other additives in addition to the above-described components. As the other additives, a surface conditioner, a leveling agent, a plasticizer, an antifoaming agent, an ultraviolet absorbing agent, an antioxidant, a viscosity modifier, and the like can be used. In addition, the additives can be used in combination of two or more kinds.

In the fourth aspect of the invention, heat is used so as to allow the hydrophilic treatment coating composition of the third aspect of the invention and the primer layer to react with each other. As an apparatus that generates heat, for example, an electric oven, a hot air drier, an infrared ray irradiation apparatus, and the like can be used. As a commercially available product thereof, UWL-300N manufactured by TRP TRADING CO., LTD., and the like can be used.

Components, which remain on the coated film formed through reaction between the hydrophilic treatment coating composition of the third aspect of the invention and the primer layer without reacting with the primer layer, are washed with water and the like, and the hydrophilic treatment of the fourth aspect of the invention is terminated.

In the fourth aspect of the invention, the primer layer may not be provided in advance. As a composition that is allowed to react with a surface layer, which contains an inorganic compound, of crockery and the like, a hydrophilic treatment coating composition, which contains the silane coupling agent, the hydrophilic compound, and the compatibilizer, may be used. According to a method of using this composition, it is possible to perform a primer treatment process with the silane coupling agent, and a hydrophilic treatment process of allowing the hydrophilic compound to react with the silane coupling agent at once. Accordingly, for example, when using the composition with respect to crockery such as a toilet bowl and a washstand which are installed already in house or office, it is possible to shorten the working time at an installation site of the crockery.

In the fourth aspect of the invention, a first liquid that contains the silane coupling agent and the like, and a second liquid that contains the hydrophilic compound (B), the compatibilizer, and the like may be separately prepared. Immediately before performing work with respect to the surface layer, the first liquid and the second liquid may be mixed and used. When the first liquid and the second liquid are separately prepared in advance, it is possible to suppress hydrolysis of the silane coupling agent due to a catalytic operation of the functional group of the hydrophilic compound (B) during storage before use. Accordingly, it is possible to suppress a decrease in reactivity with the surface layer due to dehydration and condensation between silanol groups which are generated during storage, and it is possible to prevent particulates from being generated. In addition, the second liquid may contain a catalyst that promotes hydrolysis of the silane coupling agent in alkoxy silane.

EXAMPLES

Hereinafter, the invention will be described in more detail with reference to Examples and Comparative Examples, but the invention is not limited thereto.

Hereinafter, a description will be given of Examples 1A to 24A, and Comparative Examples 1A to 12A according to the first aspect and the second aspect of the invention.

Examples 1A, 2A, and 3A

The following compositions were obtained for reaction with the primer layer 1A. Specifically, 27.5 parts by weight of ion exchanged water and 10 parts by weight of urea were mixed and stirred until the urea was dissolved. Then, 50.0 parts by weight of sodium N-t-butylacrylamide sulfonate (50 wt % aqueous solution, number-average molecular weight: 229), 2.5 parts by weight of IRGACURE (registered trademark) 500 (a mixture of 1-hydroxy-cyclohexyl-phenyl-ketone and benzophenone) manufactured by BASF, and 10.0 parts by weight of isopropyl alcohol were added to the resultant mixture, and this mixture was stirred until a transparent uniform solution was obtained, thereby obtaining compositions of Examples 1A, 2A, and 3A in an amount of 100 parts by weight.

Example 4A

A composition of Example 4A was obtained in an amount of 100 parts by weight in the same manner as in Example 1A except that 2.5 parts by weight of IRGACURE (registered trademark) 2959 (1-[4-(2-hydroxyethoxy)-phenyl]-2-hydroxy-2-methyl-1-propane-1-one) manufactured by BASF was used as the radical polymerization initiator.

Example 5A

A composition of Example 5A was obtained in an amount of 100 parts by weight in the same manner as in Example 1A except that 2.5 parts by weight of DAROCURE (registered trademark) 1173 (2-hydroxy-2-methyl-1-phenyl-propane-1-one) manufactured by BASF was used as the radical polymerization initiator.

Example 6A

A composition of Example 6A was obtained in an amount of 100 parts by weight in the same manner as in Example 1A except that 71.6 parts by weight of sodium vinyl sulfonate (35 wt % aqueous solution, number-average molecular weight: 130.1) was used as the hydrophilic compound.

Example 7A

A composition of Example 7A was obtained in an amount of 100 parts by weight in the same manner as in Example 1A except that 25.0 parts by weight of 2-sodium sulfoethyl methacrylate (100 wt % solid content, number-average molecular weight: 216) was used as the hydrophilic compound.

Example 8A

A composition of Example 8A was obtained in an amount of 100 parts by weight in the same manner as in Example 1A except that 25.0 parts by weight of sodium allyl sulfonate (100 wt % solid content, number-average molecular weight: 144.1) was used as the hydrophilic compound.

Example 9A

A composition of Example 9A was obtained in an amount of 100 parts by weight in the same manner as in Example 1A except that 25.0 parts by weight of sodium p-styrene sulfonate (100 wt % solid content, number-average molecular weight: 206) was used as the hydrophilic compound.

Example 10A

A composition of Example 10A was obtained in an amount of 100 parts by weight in the same manner as in Example 1A except that 50.0 parts by weight of sodium sulfonate-containing urethane acrylate (50.0 wt % solution, number-average molecular weight: 288), which was obtained in Synthesis Example 1, was used as the hydrophilic compound.

Example 11A

A composition of Example 11A was obtained in an amount of 100 parts by weight in the same manner as in Example 1A except that 25.0 parts by weight of sodium 3-mercapto-1-propane sulfonate (100 wt % solid content, number-average molecular weight: 178.2) was used as the hydrophilic compound.

Example 12A

A composition of Example 12A was obtained in an amount of 100 parts by weight in the same manner as in Example 1A except that 25.0 parts by weight of N-t-butylacrylamide sulfonic acid (100 wt % solid content, number-average molecular weight: 207) was used as the hydrophilic compound.

Example 13A to 18A

Compositions of Examples 13A to 18A were obtained in an amount of 100 parts by weight in the same manner as in Example 1A except that 25.0 parts by weight of dimethyl sulfoxide, 25.0 parts by weight of glycerin, 25.0 parts by weight of sucrose, 35.0 parts by weight of aqueous sodium carboxymethyl cellulose solution (Adjustment Example 1, 30.0 wt % aqueous solution of Cellogen WS-C manufactured by Dai-ichi Kogyo Seiyaku Co., Ltd.), 35.0 parts by weight of polyvinylpyrrolidone (30.0 wt % solution, Pitts call K-30L manufactured by Dai-ichi Kogyo Seiyaku Co., Ltd.), and 25.0 parts by weight of sodium hydrogen carbonate were respectively used as the compatibilizer.

Example 19A

A composition of Example 19A was obtained in an amount of 100 parts by weight in the same manner as in Example 1A except that 50.0 parts by weight of potassium N-t-butyl acrylamide sulfonate (50 wt % aqueous solution, number-average molecular weight: 245.1) obtained in Synthesis Example 2 was used as the hydrophilic compound.

Example 20A to 23A

Compositions of Examples 20A to 23A were obtained in an amount of 100 parts by weight in the same manner as in Example 1A for reaction with the primer layers 2A to 5A.

Example 24A

In a state in which the primer layers 1A to 5A were not provided, 20 parts of A solution was prepared in advance as follows. 0.5 parts by weight of 3-acryloxypropyltrimethoxysilane as the silane coupling agent containing the radical reactive functional group, and 19.5 parts by weight of 1-methoxy-2-propanol as the solvent were uniformly mixed. In addition, 80 parts of B solution was separately prepared as follows. 14.4 parts by weight of ion exchanged water and 10 parts by weight of urea were mixed and stirred until the urea was dissolved, and 50.0 parts by weight of sodium N-t-butyl acrylamide sulfonate (50 wt % aqueous solution, number-average molecular weight: 229), 5.0 parts by weight of IRGACURE (registered trademark) 500 (a mixture of 1-hydroxy-cyclohexyl-phenyl-ketone and benzophenone) manufactured by BASF, and 0.6 parts by weight of 3% hydrochloric acid aqueous solution for hydrolysis of the silane coupling agent were added to the resultant mixture. This mixture was stirred until a transparent uniform solution was obtained. Immediately before application to an object to be coated, the A solution and the B solution were uniformly mixed, thereby obtaining a composition of Example 24A in an amount of 100 parts by weight.

Comparative Example 1A

A composition of Comparative Example 1A was obtained in an amount of 100 parts by weight in the same manner as in Example 1A except that urea as the compatibilizer was not added.

Comparative Example 2A

A composition of Comparative Example 2A was obtained in an amount of 100 parts by weight in the same manner as in Example 1A except that IRGACURE (registered trademark) 500 as the radical polymerization initiator was not added.

Comparative Example 3A

A composition of Comparative Example 3A was obtained in an amount of 100 parts by weight in the same manner as in Example 1A except that 25.0 parts by weight of w-carboxy-polycaprolactone (n≈2) monoacrylate (100 wt % liquid, M-5300 manufactured by Toagosei Co., Ltd.) was used as the hydrophilic compound.

Comparative Example 4A

A composition of Comparative Example 4A was obtained in an amount of 100 parts by weight in the same manner as in Example 1A by using 25.0 parts by weight of 2-methacryloyloxy ethyl acid phosphate (100 wt % liquid, Light Ester P-1M manufactured by Kyoeisha Chemical Co., Ltd.) as the hydrophilic compound.

Comparative Example 5A

A composition of Comparative Example 5A was obtained in an amount of 100 parts by weight in the same manner as in Example 1A except that 25.0 parts by weight of dimethylaminopropyl acrylamide methyl chloride quarternary salt (100 wt % liquid, DMAPAA-Q (registered trademark), manufactured by KJ Chemicals Corporation) was used as the hydrophilic compound.

Comparative Example 6A

A composition of Comparative Example 6A was obtained in an amount of 100 parts by weight in the same manner as Example 1A except that 25.0 parts by weight of alkoxypolyethyleneglycol methacrylate (100 wt % liquid, Antox LMA-27 manufactured by Nippon Nyukazai Co., Ltd.) was used as the hydrophilic compound.

Comparative Example 7A

A composition of Comparative Example 7A was obtained in an amount of 100 parts by weight in the same manner as in Example 1A by using 25.0 parts by weight of hydroxyethyl acrylate (100 wt % liquid, Light Ester HOA(N) manufactured by Kyoeisha Chemical Co., Ltd.) as the hydrophilic compound.

Comparative Example 8A

A composition of Comparative Example 8A was obtained in an amount of 100 parts by weight in the same manner as in Example 1A by using 25.0 parts by weight of tetrahydrofurfuryl acrylate (100 wt % liquid, Light Acrylate THF-A manufactured by Kyoeisha Chemical Co., Ltd.) as the hydrophilic compound.

Comparative Example 9A

A composition of Comparative Example 9A was obtained in an amount of 100 parts by weight in the same manner as in Example 1A by using 25.0 parts by weight of N-vinyl-2-pyrrolidone (100 wt % liquid, N-vinylpyrrolidone manufactured by NIPPON SHOKUBAI CO., LTD.) as the hydrophilic compound.

Comparative Example 10A

A composition of Comparative Example 10A was obtained in an amount of 100 parts by weight in the same manner as in Example 1A except that 25.0 parts by weight of ammonium polyoxyethylenenonylpropenylphenylether sulfate (100 wt % liquid, Aqualon HS-10 manufactured by Dai-ichi Kogyo Seiyaku Co., Ltd.) was used as the hydrophilic compound, and urea was not added.

Comparative Example 11A

A composition of Comparative Example 11A was obtained in an amount of 100 parts by weight in the same manner as in Example 1A except that 25.0 parts by weight of ethoxylated pentaerythritol tetraacrylate (100 wt % liquid, NK Ester ATM-35E manufactured by Shin-Nakamura Chemical Co., Ltd.) was used as the hydrophilic compound.

Comparative Example 12A

A composition of Comparative Example 12A was obtained in an amount of 100 parts by weight in the same manner as in Example 1A except that 50.0 parts by weight of calcium N-t-butylacrylamide sulfonate (50 wt % aqueous solution), which was obtained by allowing calcium hydroxide to react with N-t-butylacrylamide sulfonic acid in the same manner as in Synthesis Example 2, was used as the hydrophilic compound.

The compositions of Examples 1A to 24A and Comparative Examples 1A to 12A are shown in Tables 1 to 3.

TABLE 1

| Primer layers (1A to 5A) | | | | Examples | | | | | | | |
|---|---|---|---|---|---|---|---|---|---|---|---|
| | | | | 1A<br>1A | 2A<br>1A | 3A<br>1A | 4A<br>1A | 5A<br>1A | 6A<br>1A | 7A<br>1A | 8A<br>1A |
| Hydrophilic compound | Compound name or product name | Radical reactive functional group | Hydrophilic group | | | | | | | | |
| | Sodium N-t-butyl acrylamide sulfonate | Acrylamide | Sodium sulfonate | 50.0 | 50.0 | 50.0 | 50.0 | 50.0 | | | |
| | Sodium vinyl sulfonate | Vinyl | Sodium sulfonate | | | | | | 71.6 | | |
| | 2-sodium sulfoethyl methacrylate | methacryloyl | Sodium sulfonate | | | | | | | 25.0 | |
| | Sodium allyl sulfonate | Allyl | Sodium sulfonate | | | | | | | | 25.0 |
| | Sodium p-styrene sulfonate | Styryl | Sodium sulfonate | | | | | | | | |
| | Sodium sulfonate-containing urethane acrylate*1 | Acryloyl | Sodium sulfonate | | | | | | | | |
| | N-t-butylacrylamide | Acrylamide | Sulfonic | | | | | | | | |

TABLE 1-continued

|  |  |  |  |  |  |  |  |  |  |  |
|---|---|---|---|---|---|---|---|---|---|---|
|  | sulfonic acid | acid |  |  |  |  |  |  |  |  |
|  | Sodium 3-mercapto-1-propane sulfonate | Mercapto | Sodium sulfonate |  |  |  |  |  |  |  |
| Radical polymerization initiator | IRUGACURE500 |  |  | 2.5 | 2.5 | 2.5 |  |  | 2.5 | 2.5 | 2.5 |
|  | IRUGACURE2959 |  |  |  |  |  | 2.5 |  |  |  |  |
|  | DAROCURE1173 |  |  |  |  |  |  | 2.5 |  |  |  |
| Compatibilizer | Urea |  |  | 10.0 | 10.0 | 10.0 | 10.0 | 10.0 | 10.0 | 10.0 | 10.0 |
|  | Dimethyl sulfoxide |  |  |  |  |  |  |  |  |  |  |
|  | Glycerin |  |  |  |  |  |  |  |  |  |  |
|  | Sucrose |  |  |  |  |  |  |  |  |  |  |
|  | Sodium carboxymethyl cellulose |  |  |  |  |  |  |  |  |  |  |
|  | Polyvinyl pyrrolidone |  |  |  |  |  |  |  |  |  |  |
|  | Sodium hydrogen carbonate |  |  |  |  |  |  |  |  |  |  |
| Solvent | Ion exchanged water |  |  | 27.5 | 27.5 | 27.5 | 27.5 | 27.5 | 5.9 | 52.5 | 52.5 |
|  | Isopropyl alcohol |  |  | 10.0 | 10.0 | 10.0 | 10.0 | 10.0 | 10.0 | 10.0 | 10.0 |
| Catalyst | 3% hydrochloric acid |  |  |  |  |  |  |  |  |  |  |
| Coupling agent | 3-acryloxypropyl-trimeth oxysilane |  | Acryloyl |  |  |  |  |  |  |  |  |
| Solvent | 1-methoxy-2-propanol |  |  |  |  |  |  |  |  |  |  |
|  | Total |  |  | 100.0 | 100.0 | 100.0 | 100.0 | 100.0 | 100.0 | 100.0 | 100.0 |

|  |  |  |  | Examples |  |  |  |  |  |  |
|---|---|---|---|---|---|---|---|---|---|---|
|  |  |  |  | 9A | 10A | 11A | 12A | 13A | 14A | 15A |
|  | Primer layers (1A to 5A) |  |  | 1A | 1A | 1A | 1A | 1A | 1A | 1A |
| Hydrophilic compound | Compound name or product name | Radical reactive functional group | Hydrophilic group |  |  |  |  |  |  |  |
|  | Sodium N-t-butyl acrylamide sulfonate | Acrylamide | Sodium sulfonate |  |  |  |  | 50.0 | 50.0 | 50.0 |
|  | Sodium vinyl sulfonate | Vinyl | Sodium sulfonate |  |  |  |  |  |  |  |
|  | 2-sodium sulfoethyl methacrylate | methacryloyl | Sodium sulfonate |  |  |  |  |  |  |  |
|  | Sodium allyl sulfonate | Allyl | Sodium sulfonate |  |  |  |  |  |  |  |
|  | Sodium p-styrene sulfonate | Styryl | Sodium sulfonate | 25.0 |  |  |  |  |  |  |
|  | Sodium sulfonate-containing urethane acrylate*1 | Acryloyl | Sodium sulfonate |  | 50.0 |  |  |  |  |  |
|  | N-t-butylacrylamide sulfonic acid | Acrylamide | Sulfonic acid |  |  | 25.0 |  |  |  |  |
|  | Sodium 3-mercapto-1-propane sulfonate | Mercapto | Sodium sulfonate |  |  |  | 25.0 |  |  |  |
| Radical polymerization initiator | IRUGACURE500 |  |  | 2.5 | 2.5 | 2.5 | 2.5 | 2.5 | 2.5 | 2.5 |
|  | IRUGACURE2959 |  |  |  |  |  |  |  |  |  |
|  | DAROCURE1173 |  |  |  |  |  |  |  |  |  |
| Compatibilizer | Urea |  |  | 10.0 | 10.0 | 10.0 | 10.0 |  |  |  |
|  | Dimethyl sulfoxide |  |  |  |  |  |  | 25.0 |  |  |
|  | Glycerin |  |  |  |  |  |  |  | 25.0 |  |
|  | Sucrose |  |  |  |  |  |  |  |  | 25.0 |
|  | Sodium carboxymethyl cellulose |  |  |  |  |  |  |  |  |  |
|  | Polyvinyl pyrrolidone |  |  |  |  |  |  |  |  |  |
|  | Sodium hydrogen carbonate |  |  |  |  |  |  |  |  |  |
| Solvent | Ion exchanged water |  |  | 52.5 | 27.5 | 52.5 | 52.5 | 12.5 | 12.5 | 12.5 |
|  | Isopropyl alcohol |  |  | 10.0 | 10.0 | 10.0 | 10.0 | 10.0 | 10.0 | 10.0 |
| Catalyst | 3% hydrochloric acid |  |  |  |  |  |  |  |  |  |
| Coupling agent | 3-acryloxypropyl-trimeth oxysilane |  | Acryloyl |  |  |  |  |  |  |  |
| Solvent | 1-methoxy-2-propanol |  |  |  |  |  |  |  |  |  |
|  | Total |  |  | 100.0 | 100.0 | 100.0 | 100.0 | 100.0 | 100.0 | 100.0 |

*1: Synthesis Example 1

TABLE 2

| | | | | Examples | | | | | | | | |
|---|---|---|---|---|---|---|---|---|---|---|---|---|
| | | | | 16A | 17A | 18A | 19A | 20A | 21A | 22A | 23A | 24A |
| | Primer layers (1A to 5A) | | | 1A | 1A | 1A | 1A | 2A | 3A | 4A | 5A | None |
| Hydrophilic compound | Compound name or product name | Radical reactive functional group | Hydrophilic group | | | | | | | | | |
| | Sodium N-t-butyl acrylamide sulfonate | Acrylamide | Sodium sulfonate | 50.0 | 50.0 | 50.0 | | 50.0 | 50.0 | 50.0 | 50.0 | 50.0 |
| | Sodium vinyl sulfonate | Vinyl | Sodium sulfonate | | | | | | | | | |
| | 2-sodium sulfoethyl methacrylate | methacryloyl | Sodium sulfonate | | | | | | | | | |
| | Sodium allyl sulfonate | Allyl | Sodium sulfonate | | | | | | | | | |
| | Sodium p-styrene sulfonate | Styryl | Sodium sulfonate | | | | | | | | | |
| | Sodium sulfonate-containing urethane acrylate *1 | Acryloyl | Sodium sulfonate | | | | | | | | | |
| | N-t-butyl-acrylamide sulfonic acid | Acrylamide | Sulfonic acid | | | | | | | | | |
| | Potassium N-t-butyl-acrylamide sulfonate *2 | Acrylamide | Potassium sulfonate | | | | 50.0 | | | | | |
| | Sodium 3-mercapto-1-propane sulfonate | Mercapto | Sodium sulfonate | | | | | | | | | |
| Radical polymerization initiator | IRUGACURE500 | | | 2.5 | 2.5 | 2.5 | 2.5 | 2.5 | 2.5 | 2.5 | 2.5 | 5.0 |
| | IRUGACURE2959 | | | | | | | | | | | |
| | DAROCURE1173 | | | | | | | | | | | |
| Compatibilizer | Urea | | | | | | 10.0 | 10.0 | 10.0 | 10.0 | 10.0 | 10.0 |
| | Dimethyl sulfoxide | | | | | | | | | | | |
| | Glycerin | | | | | | | | | | | |
| | Sucrose | | | | | | | | | | | |
| | Sodium carboxymethyl cellulose | | | 35.0 | | | | | | | | |
| | Polyvinyl pyrrolidone | | | | 35.0 | | | | | | | |
| | Sodium hydrogen carbonate | | | | | 25.0 | | | | | | |
| Solvent | Ion exchanged water | | | 2.5 | 2.5 | 12.5 | 27.5 | 27.5 | 27.5 | 27.5 | 27.5 | 14.4 |
| | Isopropyl alcohol | | | 10.0 | 10.0 | 10.0 | 10.0 | 10.0 | 10.0 | 10.0 | 10.0 | |
| Catalyst | 3% hydrochloric acid | | | | | | | | | | | 0.6 |
| Coupling agent | 3-acryloxypropyl-trimethoxy silane | Acryloyl | | | | | | | | | | 0.5 |
| Solvent | 1-methoxy-2-propanol | | | | | | | | | | | 19.5 |
| | Total | | | 100.0 | 100.0 | 100.0 | 100.0 | 100.0 | 100.0 | 100.0 | 100.0 | 100.0 |

*1: Synthesis Example 1
*2: Synthesis Example 2

TABLE 3

| | | | | Comparative Examples | | | | | | | | | | | | |
|---|---|---|---|---|---|---|---|---|---|---|---|---|---|---|---|---|
| | | | | 1A | 2A | 3A | 4A | 5A | 6A | 7A | 8A | 9A | 10A | 11A | 12A |
| | Primer layers (1A to 5A) | | | 1A | 1A | 1A | 1A | 1A | 1A | 1A | 1A | 1A | 1A | 1A | 1A |
| Hydrophilic compound | Compound name or product name | Radical reactive functional group | Hydrophilic group | | | | | | | | | | | | |
| | Sodium N-t-butyl acrylamide sulfonate | Acrylamide | Sodium sulfonate | 50.0 | 50.0 | | | | | | | | | | |
| | ω-carboxy-polycar-prolactone | Acryloyl | Carboxylic acid | | | | 25.0 | | | | | | | | |

TABLE 3-continued

|  |  |  |  | Comparative Examples | | | | | | | | | | | |
|---|---|---|---|---|---|---|---|---|---|---|---|---|---|---|---|
|  |  |  |  | 1A | 2A | 3A | 4A | 5A | 6A | 7A | 8A | 9A | 10A | 11A | 12A |
|  | monoacrylate |  |  |  |  |  |  |  |  |  |  |  |  |  |  |
|  | 2-Methacryloyloxy ethyl acid phosphate | methacryloyl | Phosphoric acid |  |  |  | 25.0 |  |  |  |  |  |  |  |  |
|  | Dimethylaminopropyl acrylamide methyl chloride quarternary salt | Acrylamide | Methyl chloride quarternary amine salt |  |  |  |  | 25.0 |  |  |  |  |  |  |  |
|  | Alkoxypolyethyleneglycol methacrylate | methacryloyl | Polyethylene chain |  |  |  |  |  | 25.0 |  |  |  |  |  |  |
|  | Hydroxyethyl acrylate | Acryloyl | Hydroxyl group |  |  |  |  |  |  | 25.0 |  |  |  |  |  |
|  | Tetrahydrofurfuryl acrylate | Acryloyl | Tetrahydrofuran |  |  |  |  |  |  |  | 25.0 |  |  |  |  |
|  | N-vinyl-2-pyrrolidone | Vinyl | Pyrrolidone |  |  |  |  |  |  |  |  | 25.0 |  |  |  |
|  | Ammonium polyoxyethylenenonylpropenylphenylether sulfate | Propenyl | Ammonium sulfonate |  |  |  |  |  |  |  |  |  | 25.0 |  |  |
|  | Ethoxylated pentaerythritol tetraacrylate | Acryloyl | Polyethylene chain |  |  |  |  |  |  |  |  |  |  | 25.0 |  |
|  | Calcium N-t-butylacrylamide sulfonate | Acrylamide | Calcium sulfonate |  |  |  |  |  |  |  |  |  |  |  | 50.0 |
| Radical polymerization initiator |  | IRUGACURE500 IRUGACURE2959 DAROCURE1173 |  | 2.5 |  | 2.5 | 2.5 | 2.5 | 2.5 | 2.5 | 2.5 | 2.5 | 2.5 | 2.5 | 2.5 |
| Compatibilizer |  | Urea Dimethyl sulfoxide |  |  | 10.0 | 10.0 | 10.0 | 10.0 | 10.0 | 10.0 | 10.0 | 10.0 | 0.0 | 10.0 | 10.0 |
| Solvent |  | Ion exchanged water |  | 37.5 | 30.0 | 52.5 | 52.5 | 52.5 | 52.5 | 52.5 | 52.5 | 52.5 | 62.5 | 52.5 | 27.5 |
|  |  | Isopropyl alcohol |  | 10.0 | 10.0 | 10.0 | 10.0 | 10.0 | 10.0 | 10.0 | 10.0 | 10.0 | 10.0 | 10.0 | 10.0 |
| Catalyst |  | 3% hydrochloric acid |  |  |  |  |  |  |  |  |  |  |  |  |  |
| Coupling agent | 3-acryloxypropyltrimethoxysilane | Acryloyl |  |  |  |  |  |  |  |  |  |  |  |  |  |
| Solvent |  | 1-methoxy-2-propanol |  |  |  |  |  |  |  |  |  |  |  |  |  |
|  |  | Total |  | 100.0 | 100.0 | 100.0 | 100.0 | 100.0 | 100.0 | 100.0 | 100.0 | 100.0 | 100.0 | 100.0 | 100.0 |

Each of the compositions was applied to each of the primer layers 1A to 5A, which were formed with respect to crockery that contains silicon oxide in a surface thereof, as illustrated in Table 1 to Table 3, and the composition was dried using an electric oven at 60° C. for 30 minutes and was left stationary at room temperature for 30 minutes. Then, irradiation with ultraviolet rays was performed by using a high-pressure mercury lamp with energy of 1000 mJ/cm$^2$ as an integral of light to form a coated film in Examples other than Example 2A and Example 3A. With regard to the composition of Example 12A, after performing irradiation with ultraviolet rays, cotton fabric immersed in 5 wt % sodium hydroxide aqueous solution was applied to the coated film, and the coated film was washed with water after 5 minutes to neutralize a sulfonic acid group that is a hydrophilic group into sodium sulfonate. With regard to Example 2A, a coated film was formed by using a metal halide lamp, and with regard to Example 3A, a coated film was formed by using an ultraviolet LED lamp having a peak light-emitting wavelength of 365 nm. In addition, in Example 24A, the primer layers 1A to 5A were not provided. The A solution and the B solution were blended. After application of the resultant blended solution, drying was performed in the same manner as in the method, and irradiation with ultraviolet rays was performed by using a high-pressure mercury lamp to form a coated film.

On the assumption that the coated film was formed with respect to crockery such as a toilet bowl and a washstand which are installed at a water-using site, durability of the coated film when being washed with a washing agent, and washability of the coated film with respect to an organic material such as oil and fat as a contaminant, and an inorganic material were evaluated by the following method.

As a standard for evaluation of the durability of the coated film that was formed, a contact angle of a water droplet with respect to a surface of the coated film was used in conformity to JIS R 3257 "Testing method of wettability of glass substrate" (a static drop method was used as a type of the testing method). Specifically, with regard to measurement of a contact angle of a water droplet, DSA20E manufactured by KRUSS was used. 4 μL of distilled water was added dropwise to the coated film, and a contact angle after 60 seconds was measured. This method uses the following phenomenon. Specifically, when a physical or chemical variation occurs in the coated film formed after being subjected to a physical or chemical treatment, the contact angle of the water droplet varies. A state, in which the coated film was not subjected to any treatment, pertains to "initial". A treatment, in which the coated film was immersed in ion exchanged water maintained at 40° C. for 240 hours, pertains to "water resistance". A treatment, in which a flushable toilet brush manufactured by Johnson Company, Limited was reciprocated 1000 times under a load of 500 gf in water maintained at 20 to 25° C., pertains to "abrasion resistance". A treatment, in which the coated film was immersed in Sanpore (registered trademark, manufactured by Dainihon Jochugiku Co., Ltd.) maintained at 40° C. for 24 hours, pertains to "detergent resistance (acidic)". A treatment, in which the coated film was immersed in Toilet Magic Lynn (registered trademark, manufactured by Kao Corporation) maintained at 40° C. for 24 hours, pertains to "detergent resistance (neutral)". A treatment, in which the coated film was immersed in Kabi Killer (registered trademark, manufactured by Johnson Company, Limited) maintained at 40° C. for 24 hours, pertains to "detergent resistance (alkaline)". The contact angle of the water droplet was measured with respect to the respective treatments, and evaluation was made as follows. A case where the contact angle of the water droplet was 10° or less was evaluated as "A". A case where the contact angle of the water droplet was greater than 10° and equal to or less than 20° was evaluated as "B". A case where the contact angle was greater than 20° and equal to or less than 40° was evaluated as "C". A case where the contact angle was greater than 40° was evaluated as "D". "A", "B", and "C" were determined as "passing", and "D" was determined as "failing".

As a standard for evaluation of washability of the coated film that was formed, washability with respect to an organic material such as oil and fat, and washability with respect to an inorganic material were evaluated, respectively. With regard to removability of the organic material such as oil and fat, oleic acid that is typically used in foods was used, and evaluation was made as to "oleic acid removability". Specifically, 300 μL of oleic acid was added dropwise to the coated film and was immersed in water in a quiet manner, and then time taken for oleic acid to float from a surface of the coated film was measured. A case where the time taken for the oleic acid to float from the surface of the coated film was 30 seconds or less was evaluated as "A", a case where the time was greater than 30 seconds and equal to or less than 60 seconds was evaluated as "B", a case where the time was greater than 60 seconds and equal to or less than 120 seconds was evaluated as "C", and a case where the time was greater than 120 seconds was evaluated as "D". "A", "B", and "C" were determined as "passing", and "D" was determined as "failing".

In addition, with regard to the washability with respect to the inorganic material, Evian (registered trademark), which is hard water containing calcium and magnesium in a predetermined amount or more, was used, and evaluation was made as to "mineral removability". Specifically, 500 μL of hard water was added dropwise to the coated film, and the coated film was dried at 40° C. for 24 hours to form a white water droplet spot, and a flushable toilet brush manufactured by Johnson Company, Limited was reciprocated 10 or 20 times under a load of 500 gf in water maintained at 20 to 25° C. Then, a remaining water droplet spot was observed through visual observation. In washing with the brush, a case where the water droplet spot was not seen after 10 times of reciprocation was evaluated as "A", a case where the water droplet spot was not seen after 20 times of reciprocation was evaluated as "B", a case where the water droplet spot was slightly seen after 20 times of reciprocation was evaluated as "C", and a case where the water droplet spot was clearly seen after 20 times of reciprocation was evaluated as "D". "A", "B", and "C" were determined as "passing", and "D" was determined as "failing".

The durability and the washability were measured as described above, and collective results for each of Examples and Comparative Examples are shown in Table 4 to Table 6. An example in which an evaluation result of "D" was not present was determined as "marketability is sufficient", and an example in which the evaluation result of "D" was present was determined as "marketability is deficient".

TABLE 4

| | | | Examples | | | | | | | | | | | | | | | |
|---|---|---|---|---|---|---|---|---|---|---|---|---|---|---|---|---|---|---|
| | | | 1A | 2A | 3A | 4A | 5A | 6A | 7A | 8A | 9A | 10A | 11A | 12A | 13A | 14A | 15A |
| Reaction means | Irradiation with ultraviolet rays | High-pressure mercury lamp | O | | | O | O | O | O | O | O | O | O | O | O | O | O |
| | | Metal halide lamp | | O | | | | | | | | | | | | | |
| | | Ultraviolet LED lamp | | | O | | | | | | | | | | | | |
| Post-treatment | Neutralization | Treatment | | | | | | | | | | | | O | | | |
| Evaluation | Durability | Initial | A | A | A | A | A | A | A | A | A | A | A | A | A | A | A |
| | | Water resistance | B | B | B | B | B | B | C | B | B | B | B | B | B | B | B |
| | | Abrasion resistance | B | B | B | B | B | B | B | B | B | C | B | B | B | B | B |
| | | Detergent resistance (acidic) | B | B | B | B | B | B | C | B | B | B | B | B | B | B | B |
| | | Detergent resistance (neutral) | A | A | A | A | A | A | A | A | A | A | A | A | A | A | A |
| | | Detergent resistance (alkaline) | B | B | B | B | B | B | B | B | B | B | B | B | B | B | B |
| | Washability | Oleic acid removability | B | B | B | A | A | A | A | A | B | C | B | B | B | B | B |
| | | Mineral removability | B | B | B | A | A | A | A | A | B | B | B | B | B | B | B |

TABLE 5

| | | | \multicolumn{9}{c}{Examples} |
| --- | --- | --- | --- | --- | --- | --- | --- | --- | --- | --- | --- |
| | | | 16A | 17A | 18A | 19A | 20A | 21A | 22A | 23A | 24A |
| Reaction means | Irradiation with ultraviolet rays | High-pressure mercury lamp Metal halide lamp Ultraviolet LED lamp | O | O | O | O | O | O | O | O | O |
| Post-treatment | Neutralization Treatment | | | | | | | | | | |
| Evaluation | Durability | Initial | A | A | A | A | A | A | A | A | B |
| | | Water resistance | B | B | B | B | B | B | B | B | B |
| | | Abrasion resistance | B | B | B | B | B | B | B | B | C |
| | | Detergent resistance (acidic) | B | B | B | B | B | B | B | B | B |
| | | Detergent resistance (neutral) | A | A | A | A | A | A | A | A | B |
| | | Detergent resistance (alkaline) | B | B | B | B | B | B | B | B | B |
| | Washability | Oleic acid removability | B | B | B | B | B | B | B | B | C |
| | | Mineral removability | B | B | B | B | B | B | B | B | C |

TABLE 6

| | | | \multicolumn{12}{c}{Comparative Examples} |
| --- | --- | --- | --- | --- | --- | --- | --- | --- | --- | --- | --- | --- | --- | --- |
| | | | 1A | 2A | 3A | 4A | 5A | 6A | 7A | 8A | 9A | 10A | 11A | 12A |
| Reaction means | Irradiation with ultraviolet rays | High-pressure mercury lamp Metal halide lamp Ultraviolet LED lamp | O | O | O | O | O | O | O | O | O | O | O | O |
| Post-treatment | Neutralization Treatment | | | | | | | | | | | | | |
| Evaluation | Durability | Initial | D | D | B | B | A | B | C | B | A | A | B | A |
| | | Water resistance | D | D | B | B | C | B | C | B | B | C | D | B |
| | | Abrasion resistance | D | D | B | B | B | C | C | C | B | B | D | B |
| | | Detergent resistance (acidic) | D | D | D | C | D | B | C | C | C | D | D | C |
| | | Detergent resistance (neutral) | D | D | C | B | D | B | C | B | B | D | D | B |
| | | Detergent resistance (alkaline) | D | D | B | B | D | D | C | B | C | D | D | C |
| | Washability | Oleic acid removability | D | D | D | D | D | D | D | D | D | D | D | B |
| | | Mineral removability | C | C | D | D | D | B | D | D | D | B | D | D |

Examples 25A and 26A

The following compositions were obtained for reaction with the primer layer 1A. Specifically, 27.5 parts by weight of ion exchanged water and 10 parts by weight of urea were mixed and stirred until the urea was dissolved. Then, 50.0 parts by weight of sodium N-t-butylacrylamide sulfonate (50 wt % aqueous solution, number-average molecular weight: 229), 2.5 parts by weight of sodium persulfate, and 10.0 parts by weight of isopropyl alcohol were added to the resultant mixture, and this mixture was stirred until a transparent uniform solution was obtained, thereby obtaining compositions of Examples 25A and 26A in an amount of 100 parts by weight.

Example 27A

A composition of Example 27A was obtained in an amount of 100 parts by weight in the same manner as Example 25A except that 2.5 parts by weight of V-50 (2,2'-azobis(propane-2-carboamidine)dihydrochloride, manufactured by Wako Pure Chemical Industries, Ltd.) was used as the radical polymerization initiator.

Example 28A

A composition of Example 28A was obtained in an amount of 100 parts by weight in the same manner as Example 25A except that 5.0 parts by weight of Perhexyl PV-50E (emulsion of t-hexylperoxy pivalate, effective component: 50% by weight manufactured by NOF CORPORATION) was used as the radical polymerization initiator.

Example 29A

A composition of Example 29A was obtained in an amount of 100 parts by weight in the same manner as in Example 25A except that 71.6 parts by weight of sodium vinyl sulfonate (35 wt % aqueous solution, number-average molecular weight: 130.1) was used as the hydrophilic compound.

Example 30A

A composition of Example 30A was obtained in an amount of 100 parts by weight in the same manner as in Example 25A except that 25.0 parts by weight of 2-sodium sulfoethyl methacrylate (100 wt % solid content, number-average molecular weight: 216) was used as the hydrophilic compound.

Example 31A

A composition of Example 31A was obtained in an amount of 100 parts by weight in the same manner as in Example 25A except that 25.0 parts by weight of sodium allyl sulfonate (100 wt % solid content, number-average molecular weight: 144.1) was used as the hydrophilic compound.

Example 32A

A composition of Example 32A was obtained in an amount of 100 parts by weight in the same manner as in Example 25A except that 25.0 parts by weight of sodium p-styrene sulfonate (100 wt % solid content, number-average molecular weight: 206) was used as the hydrophilic compound.

Example 33A

A composition of Example 33A was obtained in an amount of 100 parts by weight in the same manner as in Example 25A except that 50.0 parts by weight of sodium sulfonate-containing urethane acrylate (50.0 wt % solution, number-average molecular weight: 288), which was obtained in Synthesis Example 1, was used as the hydrophilic compound.

Example 34A

A composition of Example 34A was obtained in an amount of 100 parts by weight in the same manner as in Example 25A except that 25.0 parts by weight of sodium 3-mercapto-1-propane sulfonate (100 wt % solid content, number-average molecular weight: 178.2) was used as the hydrophilic compound.

Example 35A

A composition of Example 35A was obtained in an amount of 100 parts by weight in the same manner as in Example 25A except that 25.0 parts by weight of N-t-butylacrylamide sulfonic acid (100 wt % solid content, number-average molecular weight: 207) was used as the hydrophilic compound.

Examples 36A to 41A

Compositions of Examples 36A to 41A were obtained in an amount of 100 parts by weight in the same manner as in Example 25A except that 25.0 parts by weight of dimethyl sulfoxide, 25.0 parts by weight of glycerin, 25.0 parts by weight of sucrose, 35.0 parts by weight of aqueous sodium carboxymethyl cellulose solution (Adjustment Example 1, 30.0 wt % aqueous solution of Cellogen WS-C manufactured by Dai-ichi Kogyo Seiyaku Co., Ltd.), 35.0 parts by weight of aqueous polyvinylpyrrolidone solution (30.0 wt % solution, Pitts call K-30L manufactured by Dai-ichi Kogyo Seiyaku Co., Ltd.), and 25.0 parts by weight of sodium hydrogen carbonate are respectively used as the compatibilizer.

Example 42A

A composition of Example 42A was obtained in an amount of 100 parts by weight in the same manner as in Example 25A except that 50.0 parts by weight of potassium N-t-butyl acrylamide sulfonate (50 wt % aqueous solution, number-average molecular weight: 245.1) obtained in Synthesis Example 2 was used as the hydrophilic compound.

Examples 43A to 46A

Compositions of Examples 43A to 46A were obtained in an amount of 100 parts by weight in the same manner as in Example 25A for reaction with the primer layers 2A to 5A.

Example 47A

In a state in which the primer layers 1A to 5A were not provided, 20 parts of A solution was prepared in advance as follows. 0.5 parts by weight of 3-acryloxypropyltrimethoxysilane as the silane coupling agent containing the radical reactive functional group, and 19.5 parts by weight of 1-methoxy-2-propanol as the solvent were uniformly mixed. In addition, 80 parts of C solution was separately prepared as follows. 14.4 parts by weight of ion exchanged water and 10 parts by weight of urea were mixed and stirred until the urea was dissolved, 50.0 parts by weight of sodium N-t-butyl acrylamide sulfonate (50 wt % aqueous solution, number-average molecular weight: 229), 5.0 parts by weight of sodium persulfate, and 0.6 parts by weight of 3% hydrochloric acid aqueous solution for hydrolysis of the silane coupling agent were added to the resultant mixture. This mixture was stirred until a transparent uniform solution was obtained. Immediately before application to an object to be coated, the A solution and the C solution were uniformly mixed, thereby obtaining a composition of Example 47A in an amount of 100 parts by weight.

Comparative Example 13A

A composition of Comparative Example 13A was obtained in an amount of 100 parts by weight in the same manner as in Example 25A except that urea as the compatibilizer was not added.

Comparative Example 14A

A composition of Comparative Example 14A was obtained in an amount of 100 parts by weight in the same manner as in Example 25A except that sodium persulfate as the radical polymerization initiator was not added.

Comparative Example 15A

A composition of Comparative Example 15A was obtained in an amount of 100 parts by weight in the same manner as in Example 25A except that 25.0 parts by weight of w-carboxy-polycaprolactone (n≈2) monoacrylate (100 wt % liquid, M-5300 manufactured by Toagosei Co., Ltd.) was used as the hydrophilic compound.

Comparative Example 16A

A composition of Comparative Example 16A was obtained in an amount of 100 parts by weight in the same manner as in Example 25A by using 25.0 parts by weight of 2-methacryloyloxy ethyl acid phosphate (100 wt % liquid, Light Ester P-1M manufactured by Kyoeisha Chemical Co., Ltd.) as the hydrophilic compound.

Comparative Example 17A

A composition of Comparative Example 17A was obtained in an amount of 100 parts by weight in the same manner as in Example 25A except that 25.0 parts by weight of dimethylaminopropyl acrylamide methyl chloride quarternary salt (100 wt % liquid, DMAPAA-Q (registered trademark) manufactured by KJ Chemicals Corporation) was used as the hydrophilic compound.

Comparative Example 18A

A composition of Comparative Example 18A was obtained in an amount of 100 parts by weight in the same manner as Example 25A except that 25.0 parts by weight of alkoxypolyethyleneglycol methacrylate (100 wt % liquid, Antoxy LMA-27 manufactured by Nippon Nyukazai Co., Ltd.) was used as the hydrophilic compound.

Comparative Example 19A

A composition of Comparative Example 19A was obtained in an amount of 100 parts by weight in the same manner as in Example 25A by using 25.0 parts by weight of hydroxyethyl acrylate (100 wt % liquid, Light Ester HOA (N) manufactured by Kyoeisha Chemical Co., Ltd.) as the hydrophilic compound.

Comparative Example 20A

A composition of Comparative Example 20A was obtained in an amount of 100 parts by weight in the same manner as in Example 25A by using 25.0 parts by weight of tetrahydrofurfuryl acrylate (100 wt % liquid, Light Acrylate THF-A manufactured by Kyoeisha Chemical Co., Ltd.) as the hydrophilic compound.

Comparative Example 21A

A composition of Comparative Example 21A was obtained in an amount of 100 parts by weight in the same manner as in Example 25A by using 25.0 parts by weight of N-vinyl-2-pyrrolidone (100 wt % liquid, N-vinylpyrrolidone manufactured by NIPPON SHOKUBAI CO., LTD.) as the hydrophilic compound.

Comparative Example 22A

A composition of Comparative Example 22A was obtained in an amount of 100 parts by weight in the same manner as in Example 25A except that 25.0 parts by weight of ammonium polyoxyethylenenonylpropenylphenylether sulfate (100 wt % liquid, Aqualon HS-10 manufactured by Dai-ichi Kogyo Seiyaku Co., Ltd.) was used as the hydrophilic compound.

Comparative Example 23A

A composition of Comparative Example 23A was obtained in an amount of 100 parts by weight in the same manner as in Example 25A except that 25.0 parts by weight of ethoxylated pentaerythritol tetraacrylate (100 wt % liquid, NK Ester ATM-35E manufactured by Shin-Nakamura Chemical Co., Ltd.) was used as the hydrophilic compound.

Comparative Example 24A

A composition of Comparative Example 24A was obtained in an amount of 100 parts by weight in the same manner as in Example 25A except that 50.0 parts by weight of calcium N-t-butylacrylamide sulfonate (50 wt % aqueous solution), which was obtained by allowing calcium hydroxide to react with N-t-butylacrylamide sulfonic acid in the same manner as in Synthesis Example 2, was used as the hydrophilic compound.

The compositions of Examples 25A to 47A and Comparative Examples 13A to 24A were shown in Tables 7 to 9.

TABLE 7

| | | | | Examples | | | | | | | |
|---|---|---|---|---|---|---|---|---|---|---|---|
| | | | | 25A | 26A | 27A | 28A | 29A | 30A | 31A | 32A |
| | Primer layers (1A to 5A) | | | 1A | 1A | 1A | 1A | 1A | 1A | 1A | 1A |
| Hydrophilic compound | Compound name or product name | Radical reactive functional group | Hydrophilic group | | | | | | | | |
| | Sodium N-t-butyl acrylamide sulfonate | Acrylamide | Sodium sulfonate | 50.0 | 50.0 | 50.0 | 50.0 | | | | |
| | Sodium vinyl sulfonate | Vinyl | Sodium sulfonate | | | | | | 71.6 | | |
| | 2-sodium sulfoethyl methacrylate | methacryloyl | Sodium sulfonate | | | | | | | 25.0 | |
| | Sodium allyl sulfonate | Allyl | Sodium sulfonate | | | | | | | | 25.0 |
| | Sodium p-styrene sulfonate | Styryl | Sodium sulfonate | | | | | | | | 25.0 |
| | Sodium sulfonate-containing urethane acrylate *1 | Acryloyl | Sodium sulfonate | | | | | | | | |
| | N-t-butyl-acrylamide sulfonic acid | Acrylamide | Sulfonic acid | | | | | | | | |
| | Sodium 3-mercapto-propane sulfonate | Mercapto | Sodium sulfonate | | | | | | | | |

TABLE 7-continued

| | | | | | | | | | | |
|---|---|---|---|---|---|---|---|---|---|---|
| Radical polymerization initiator | | Sodium persulfate | 2.5 | 2.5 | | | 2.5 | 2.5 | 2.5 | 2.5 |
| | | V-50 | | | 2.5 | | | | | |
| | | Perhexyl PV-50E | | | | 5.0 | | | | |
| Compatibilizer | | Urea | 10.0 | 10.0 | 10.0 | 10.0 | 10.0 | 10.0 | 10.0 | 10.0 |
| | | Dimethyl sulfoxide | | | | | | | | |
| | | Glycerin | | | | | | | | |
| | | Sucrose | | | | | | | | |
| | | Sodium carboxymethyl cellulose | | | | | | | | |
| | | Polyvinyl pyrrolidone | | | | | | | | |
| | | Sodium hydrogen carbonate | | | | | | | | |
| Solvent | | Ion exchanged water | 27.5 | 27.5 | 27.5 | 25.0 | 5.9 | 52.5 | 52.5 | 52.5 |
| | | Isopropyl alcohol | 10.0 | 10.0 | 10.0 | 10.0 | 10.0 | 10.0 | 10.0 | 10.0 |
| Catalyst | | 3% hydrochloric acid | | | | | | | | |
| Coupling agent | 3-acryloxy-propyl-trimethoxy silane | Acryloyl | | | | | | | | |
| Solvent | | 1-methoxy-2-propanol | | | | | | | | |
| | | Total | 100.0 | 100.0 | 100.0 | 100.0 | 100.0 | 100.0 | 100.0 | 100.0 |

| | | | | Examples | | | | | |
|---|---|---|---|---|---|---|---|---|---|
| | | | | 33A | 34A | 35A | 36A | 37A | 38A |
| Hydrophilic compound | Primer layers (1A to 5A) | | | 1A | 1A | 1A | 1A | 1A | 1A |
| | Compound name or product name | Radical reactive functional group | Hydrophilic group | | | | | | |
| | Sodium N-t-butyl acrylamide sulfonate | Acrylamide | Sodium sulfonate | | | | 50.0 | 50.0 | 50.0 |
| | Sodium vinyl sulfonate | Vinyl | Sodium sulfonate | | | | | | |
| | 2-sodium sulfoethyl methacrylate | methacryloyl | Sodium sulfonate | | | | | | |
| | Sodium allyl sulfonate | Allyl | Sodium sulfonate | | | | | | |
| | Sodium p-styrene sulfonate | Styryl | Sodium sulfonate | | | | | | |
| | Sodium sulfonate-containing urethane acrylate *1 | Acryloyl | Sodium sulfonate | 50.0 | | | | | |
| | N-t-butyl-acrylamide sulfonic acid | Acrylamide | Sulfonic acid | | | 25.0 | | | |
| | Sodium 3-mercapto-propane sulfonate | Mercapto | Sodium sulfonate | | 25.0 | | | | |
| Radical polymerization initiator | | Sodium persulfate | | 2.5 | 2.5 | 2.5 | 2.5 | 2.5 | 2.5 |
| | | V-50 | | | | | | | |
| | | Perhexyl PV-50E | | | | | | | |
| Compatibilizer | | Urea | | 10.0 | 10.0 | 10.0 | | | |
| | | Dimethyl sulfoxide | | | | | 25.0 | | |
| | | Glycerin | | | | | | 25.0 | |
| | | Sucrose | | | | | | | 25.0 |
| | | Sodium carboxymethyl cellulose | | | | | | | |
| | | Polyvinyl pyrrolidone | | | | | | | |
| | | Sodium hydrogen carbonate | | | | | | | |
| Solvent | | Ion exchanged water | | 27.5 | 52.5 | 52.5 | 12.5 | 12.5 | 12.5 |
| | | Isopropyl alcohol | | 10.0 | 10.0 | 10.0 | 10.0 | 10.0 | 10.0 |
| Catalyst | | 3% hydrochloric acid | | | | | | | |
| Coupling agent | 3-acryloxy-propyl-trimethoxy silane | Acryloyl | | | | | | | |
| Solvent | | 1-methoxy-2-propanol | | | | | | | |
| | | Total | | 100.0 | 100.0 | 100.0 | 100.0 | 100.0 | 100.0 |

*1: Synthesis Example 1

TABLE 8

| | | | | Examples | | | | | | | | |
|---|---|---|---|---|---|---|---|---|---|---|---|---|
| | | | | 39A | 40A | 41A | 42A | 43A | 44A | 45A | 46A | 47A |
| | Primer layers (1A to 5A) | | | 1A | 1A | 1A | 1A | 2A | 3A | 4A | 5A | None |
| Hydrophilic compound | Compound name or product name | Radical reactive functional group | Hydrophilic group | | | | | | | | | |
| | Sodium N-t-butyl acrylamide sulfonate | Acrylamide | Sodium sulfonate | 50.0 | 50.0 | 50.0 | | 50.0 | 50.0 | 50.0 | 50.0 | 50.0 |
| | Sodium vinyl sulfonate | Vinyl | Sodium sulfonate | | | | | | | | | |
| | 2-sodium sulfoethyl methacrylate | methacryloyl | Sodium sulfonate | | | | | | | | | |
| | Sodium allyl sulfonate | Allyl | Sodium sulfonate | | | | | | | | | |
| | Sodium p-styrene sulfonate | Styryl | Sodium sulfonate | | | | | | | | | |
| | Sodium sulfonate-containing urethane acrylate *1 | Acryloyl | Sodium sulfonate | | | | | | | | | |
| | N-t-butyl-acrylamide sulfonic acid | Acrylamide | Sulfonic acid | | | | | | | | | |
| | Potassium N-t-butyl-acrylamide sulfonate *2 | Acrylamide | Potassium sulfonate | | | | 50.0 | | | | | |
| | Sodium 3-mercapto-1-propane sulfonate | Mercapto | Sodium sulfonate | | | | | | | | | |
| Radical polymerization initiator | | Sodium persulfate | | 2.5 | 2.5 | 2.5 | 2.5 | 2.5 | 2.5 | 2.5 | 2.5 | 5.0 |
| | | V-50 | | | | | | | | | | |
| | | Perhexyl PV-50E | | | | | | | | | | |
| Compatibilizer | | Urea | | | | | 10.0 | 10.0 | 10.0 | 10.0 | 10.0 | 10.0 |
| | | Dimethyl sulfoxide | | | | | | | | | | |
| | | Glycerin | | | | | | | | | | |
| | | Sucrose | | | | | | | | | | |
| | | Sodium carboxymethyl cellulose | | 35.0 | | | | | | | | |
| | | Polyvinyl pyrrolidone | | | 35.0 | | | | | | | |
| | | Sodium hydrogen carbonate | | | | 25.0 | | | | | | |
| Solvent | | Ion exchanged water | | 2.5 | 2.5 | 12.5 | 27.5 | 27.5 | 27.5 | 27.5 | 27.5 | 14.4 |
| | | Isopropyl alcohol | | 10.0 | 10.0 | 10.0 | 10.0 | 10.0 | 10.0 | 10.0 | 10.0 | |
| Catalyst | | 3% hydrochloric acid | | | | | | | | | | 0.6 |
| Coupling agent | 3-acryloxy-propyltri-methoxy silane | Acryloyl | | | | | | | | | | 0.5 |
| Solvent | | 1-methoxy-2-propanol | | | | | | | | | | 19.5 |
| | Total | | | 100.0 | 100.0 | 100.0 | 100.0 | 100.0 | 100.0 | 100.0 | 100.0 | 100 |

*1: Synthesis Example 1
*2: Synthesis Example 2

TABLE 9

| | | | | Comparative Examples | | | | | | | | | | | |
|---|---|---|---|---|---|---|---|---|---|---|---|---|---|---|---|
| | | | | 13A | 14A | 15A | 16A | 17A | 18A | 19A | 20A | 21A | 22A | 23A | 24A |
| | Primer layers (1A to 5A) | | | 1A | 1A | 1A | 1A | 1A | 1A | 1A | 1A | 1A | 1A | 1A | 1A |
| Hydrophilic compound | Compound name or product name | Radical reactive functional group | Hydrophilic group | | | | | | | | | | | | |
| | Sodium N-t-butyl acrylamide sulfonate | Acrylamide | Sodium sulfonate | 50.0 | 50.0 | | | | | | | | | | |

TABLE 9-continued

| | | | Comparative Examples | | | | | | | | | | | |
|---|---|---|---|---|---|---|---|---|---|---|---|---|---|---|
| | | | 13A | 14A | 15A | 16A | 17A | 18A | 19A | 20A | 21A | 22A | 23A | 24A |
| | ω-carboxy-polycaprolactone monoacrylate | Acryloyl | Carboxylic acid | | | 25.0 | | | | | | | | | |
| | 2-Methacryloyloxy ethyl acid phosphate | methacryloyl | Phosphoric acid | | | | 25.0 | | | | | | | | |
| | Dimethylaminopropyl acrylamide methyl chloride quarternary salt | Acrylamide | Methyl chloride quarternary amine salt | | | | | 25.0 | | | | | | | |
| | Alkoxypolyethyleneglycol methacrylate | methacryloyl | Polyethylene chain | | | | | | 25.0 | | | | | | |
| | Hydroxyethyl acrylate | Acryloyl | Hydroxyl group | | | | | | | 25.0 | | | | | |
| | Tetrahydrofurfuryl acrylate | Acryloyl | Tetrahydrofuran | | | | | | | | 25.0 | | | | |
| | N-vinyl-2-pyrrolidone | Vinyl | Pyrrolidone | | | | | | | | | 25.0 | | | |
| | Ammonium polyoxyethylene-nonylpropenyl-phenyl ether sulfate | Propenyl | Ammonium sulfonate | | | | | | | | | | 25.0 | | |
| | Ethoxylated pentaerythritol tetraacrylate (EO 35 moles) | Acryloyl | Polyethylene chain | | | | | | | | | | | 25.0 | |
| | Calcium N-t-butyl-acrylamide sulfonate | Acrylamide | Calcium sulfonate | | | | | | | | | | | | 50.0 |
| Radical polymerization initiator | | Sodium persulfate | | 2.5 | | 2.5 | 2.5 | 2.5 | 2.5 | 2.5 | 2.5 | 2.5 | 2.5 | 2.5 | 2.5 |
| | | V-50 | | | | | | | | | | | | | |
| | | Perhexyl PV-50E | | | | | | | | | | | | | |
| Compatibilizer | | Urea | | | 10.0 | 10.0 | 10.0 | 10.0 | 10.0 | 10.0 | 10.0 | 10.0 | 10.0 | 10.0 | 10.0 |
| | | Dimethyl sulfoxide | | | | | | | | | | | | | |
| Solvent | | Ion exchanged water | | 37.5 | 30.0 | 52.5 | 52.5 | 52.5 | 52.5 | 52.5 | 52.5 | 52.5 | 52.5 | 52.5 | 27.5 |
| | | Isopropyl alcohol | | 10.0 | 10.0 | 10.0 | 10.0 | 10.0 | 10.0 | 10.0 | 10.0 | 10.0 | 10.0 | 10.0 | 10.0 |
| Catalyst | | 3% hydrochloric acid | | | | | | | | | | | | | |
| Coupling agent | 3-acryloxypropyl-trimethoxysilane | Acryloyl | | | | | | | | | | | | | |
| Solvent | | 1-methoxy-2-propanol | | | | | | | | | | | | | |
| | | Total | | 100.0 | 100.0 | 100.0 | 100.0 | 100.0 | 100.0 | 100.0 | 100.0 | 100.0 | 100.0 | 100.0 | 100.0 |

Each of the compositions was applied to each of the primer layers 1A to 5A, which were formed with respect to crockery that contains silicon oxide in a surface thereof, as illustrated in Table 7 to Table 9, and drying was performed at 120° C. for 30 minutes by using an electric oven in Examples other than Example 26A to form a coated film. With regard to the composition of Example 35A, after performing drying at 120° C. for 30 minutes by using an electric oven, cotton fabric immersed in 5 wt % sodium hydroxide aqueous solution was applied to the coated film, and the coated film was washed with water after 5 minutes to neutralize a sulfonic acid group that is a hydrophilic group into sodium sulfonate. In Example 26A, irradiation with infrared rays was performed, and drying was performed for 30 minutes at a raw material temperature of 120° C. In addition, in Example 47A, the primer layers 1A to 5A were not provided. The A solution and the C solution were blended. After application of the resultant blended solution, heating was performed in the same manner as in the method to form a coated film.

Durability and washability were evaluated with respect to the coated film that was formed in the same manner as in the coated film that was formed with ultraviolet curing. Collective results for each of Examples and Comparative Examples are shown in Table 10 to Table 12. An example in which the evaluation result of "D" was not present was determined as "marketability is sufficient", and an example in which the evaluation result of "D" was present was determined as "marketability is deficient".

TABLE 10

| | | | \multicolumn{14}{c}{Examples} |
|---|---|---|---|---|---|---|---|---|---|---|---|---|---|---|---|---|
| | | | 25A | 26A | 27A | 28A | 29A | 30A | 31A | 32A | 33A | 34A | 35A | 36A | 37A | 38A |
| Reaction means | Drying by electric oven (120° C., 30 minutes) | | O | | O | O | O | O | O | O | O | O | O | O | O | O |
| | Drying by irradiation with infrared rays (120° C., 30 minutes) | | | O | | | | | | | | | | | | |
| Post-treatment | Neutralization Treatment | | | | | | | | | | | | O | | | |
| Evaluation | Durability | Initial | A | A | A | A | A | A | A | A | A | A | A | A | A | A |
| | | Water resistance | B | B | B | B | B | C | B | B | B | B | B | B | B | B |
| | | Abrasion resistance | B | B | B | B | B | B | B | B | C | B | B | B | B | B |
| | | Detergent resistance (acidic) | B | B | B | B | B | C | B | B | B | B | B | B | B | B |
| | | Detergent resistance (neutral) | A | A | A | A | A | A | A | A | A | A | A | A | A | A |
| | | Detergent resistance (alkaline) | B | B | B | B | B | B | B | B | B | B | B | B | B | B |
| | Washability | Oleic acid removability | B | B | A | A | A | A | A | B | C | B | B | B | B | B |
| | | Mineral removability | B | B | A | A | A | A | A | B | B | B | B | B | B | B |

TABLE 11

| | | | \multicolumn{9}{c}{Examples} |
|---|---|---|---|---|---|---|---|---|---|---|---|
| | | | 39A | 40A | 41A | 42A | 43A | 44A | 45A | 46A | 47A |
| Reaction means | Drying by electric oven (120° C., 30 minutes) | | O | O | O | O | O | O | O | O | O |
| | Drying by irradiation with infrared rays (120° C., 30 minutes) | | | | | | | | | | |
| Post-treatment | Neutralization Treatment | | | | | | | | | | |
| Evaluation | Durability | Initial | A | A | A | A | A | A | A | A | B |
| | | Water resistance | B | B | B | B | B | B | B | B | B |
| | | Abrasion resistance | B | B | B | B | B | B | B | B | B |
| | | Detergent resistance (acidic) | B | B | B | B | B | B | B | B | B |
| | | Detergent resistance (neutral) | A | A | A | A | A | A | A | A | B |
| | | Detergent resistance (alkaline) | B | B | B | B | B | B | B | B | B |
| | Washability | Oleic acid removability | B | B | B | B | B | B | B | B | C |
| | | Mineral removability | B | B | B | B | B | B | B | B | C |

TABLE 12

| | | | \multicolumn{12}{c}{Comparative Examples} |
|---|---|---|---|---|---|---|---|---|---|---|---|---|---|---|
| | | | 13A | 14A | 15A | 16A | 17A | 18A | 19A | 20A | 21A | 22A | 23A | 24A |
| Reaction means | Drying by electric oven (120° C., 30 minutes) | | O | O | O | O | O | O | O | O | O | O | O | O |
| | Drying by irradiation with infrared rays (120° C., 30 minutes) | | | | | | | | | | | | | |
| Post-treatment | Neutralization Treatment | | | | | | | | | | | | | |
| Evaluation | Durability | Initial | D | D | B | B | A | B | C | B | A | A | B | A |
| | | Water resistance | D | D | B | B | C | B | C | B | B | C | D | B |
| | | Abrasion resistance | D | D | B | B | B | C | C | C | B | B | D | B |
| | | Detergent resistance (acidic) | D | D | D | C | D | B | C | C | C | D | D | C |

TABLE 12-continued

| | | Comparative Examples | | | | | | | | | | | |
|---|---|---|---|---|---|---|---|---|---|---|---|---|
| | | 13A | 14A | 15A | 16A | 17A | 18A | 19A | 20A | 21A | 22A | 23A | 24A |
| | Detergent resistance (neutral) | D | D | C | B | D | B | C | B | B | D | D | B |
| | Detergent resistance (alkaline) | D | D | B | B | D | D | C | B | C | D | D | C |
| Washability | Oleic acid removability | D | D | D | D | D | D | D | D | D | D | D | B |
| | Mineral removability | C | C | D | D | D | B | D | D | D | B | D | D |

Hereinafter, a description will be given of Examples 1B to 15B, and Comparative Examples 1B to 10B according to the third aspect and the fourth aspect of the invention.

Example 1B

The following composition was obtained for reaction with the primer layer 1B. Specifically, 30.0 parts by weight of ion exchanged water and 10 parts by weight of urea were mixed and stirred until the urea was dissolved. 50.0 parts by weight of sodium 2-aminoethyl sulfonate (50 wt % aqueous solution, number-average molecular weight: 147.2), and 10.0 parts by weight of isopropyl alcohol were added to the resultant mixture, and this mixture was stirred until a transparent uniform solution was obtained, thereby obtaining a composition of Example 1B in an amount of 100 parts by weight.

Example 2B

A composition of Example 2B was obtained in an amount of 100 parts by weight in the same manner as in Example 1B except that 50.0 parts by weight of potassium 2-aminoethyl sulfonate (50 wt % aqueous solution, number-average molecular weight: 163.3) was used as the hydrophilic compound.

Examples 3B and 4B

Compositions of Example 3B and 4B were obtained in an amount of 100 parts by weight in the same manner as in Example 1B except that 25.0 parts by weight of 2-aminoethyl sulfonic acid (50 wt % aqueous solution, number-average molecular weight: 125.2) was used as the hydrophilic compound.

Examples 5B to 10B

Compositions of Examples 5B to 10B were obtained in an amount of 100 parts by weight in the same manner as in Example 1B except that 25.0 parts by weight of dimethyl sulfoxide, 25.0 parts by weight of glycerin, 10.0 parts by weight of sucrose, 33.3 parts by weight of 30% aqueous solution of carboxymethyl cellulose sodium, 33.3 parts by weight of 30% aqueous solution of polyvinylpyrolidone, 10.0 parts by weight of sodium hydrogen carbonate were respectively used as the compatibilizer.

Example 11B

A composition of Example 11B was obtained in an amount of 100 parts by weight in the same manner as in Example 1B except that 62.5 parts by weight of sodium 4-aminobenzene sulfonate (40 wt % aqueous solution, number-average molecular weight: 195.1) was used as the hydrophilic compound.

Example 12B

A composition of Example 12B was obtained in an amount of 100 parts by weight in the same manner as in Example 1B except that 41.7 parts by weight of sodium 2-hydroxyethyl sulfonate (60 wt % aqueous solution, number-average molecular weight: 148.1) was used as the hydrophilic compound, and 0.1 parts by weight of tin dibutyl dilaurate was used as the reaction catalyst.

Example 13B

A composition of Example 13B was obtained in an amount of 100 parts by weight in the same manner as in Example 1B for reaction with respect to the primer layer 2B.

Example 14B

The following composition was obtained for reaction with the primer layer 2B. Specifically, a composition of Example 14B was obtained in an amount of 100 parts by weight in the same manner as in Example 1B except that 50.0 parts by weight of sodium 3-mercapto-1-propane sulfonate (50 wt % aqueous solution, number-average molecular weight: 178.2) was used as the hydrophilic compound, and 1.0 parts by weight of N,N-dimethylbenzylamine was used as the reaction catalyst.

Example 15B

In a state in which the primer layers 1B and 2B were not provided, 20 parts of an A solution was prepared in advance as follows. 0.5 parts by weight of 3-isocyanatopropyltrimethoxysilane as the silane coupling agent and 19.5 parts by weight of methanol as the solvent were uniformly mixed. In addition, 80 parts of B solution was separated prepared as follows. 19.2 parts by weight of methanol and 10 parts by weight of urea were mixed and stirred until the urea was dissolved, and 50.0 parts by weight of sodium 2-aminoethyl sulfonate (50 wt % aqueous solution, number-average molecular weight: 147.2), and 0.8 parts by weight of N-methylmorpholine for hydrolysis of the silane coupling agent were added to the resultant mixture, and this mixture was stirred until a transparent uniform solution was obtained. Immediately before application to an object to be coated, the A solution and the B solution were uniformly mixed, thereby obtaining a composition of Example 15B in an amount of 100 parts by weight.

Comparative Example 1B

The following composition was obtained for reaction with the primer layer 1B. Specifically, a composition of Comparative Example 1B was obtained in an amount of 100 parts by weight in the same manner as in Example 1B except that 62.5 parts by weight of calcium 2-aminoethyl sulfonate (40 wt % aqueous solution) was used as the hydrophilic compound.

Comparative Example 2B

A composition of Comparative Example 2B was obtained in an amount of 100 parts by weight in the same manner as in Example 1B except that urea as the compatibilizer was not added.

Comparative Example 3B

A composition of Comparative Example 3B was obtained in an amount of 100 parts by weight in the same manner as in Example 1B except that 62.5 parts by weight of sodium glycine (40 wt % aqueous solution) was used as the hydrophilic compound.

Comparative Example 4B

A composition of Comparative Example 4B was obtained in an amount of 100 parts by weight in the same manner as in Example 1B except that 27.8 parts by weight of 2-amino-2-methyl-1-propaneol (90 wt % aqueous solution, AMP-90 manufactured by The Dow Chemical Company) was used as the hydrophilic compound.

Comparative Example 5B

A composition of Comparative Example 5B was obtained in an amount of 100 parts by weight in the same manner as in Example 1B except that 62.5 parts by weight of disodium dihydrogen-2-aminoethyl phosphate (40 wt % aqueous solution) was used as the hydrophilic compound.

Comparative Example 6B

A composition of Comparative Example 6B was obtained in an amount of 100 parts by weight in the same manner as in Example 1B except that 25.0 parts by weight of (2-hydroxyethyl)trimethyl ammonium chloride (40 wt % aqueous solution) was used as the hydrophilic compound.

Comparative Example 7B

A composition of Comparative Example 7B was obtained in an amount of 100 parts by weight in the same manner as in Example 1B except that 25.0 parts by weight of tetrahydrofurfuryl alcohol (100 wt % liquid) was used as the hydrophilic compound.

Comparative Example 8B

A composition of Comparative Example 8B was obtained in an amount of 100 parts by weight in the same manner as in Example 1B except that 62.5 parts by weight of polyoxyethylenelauryl ether (40 wt % aqueous solution, Cellogen WS-C manufactured by Dai-ichi Kogyo Seiyaku Co., Ltd.) was used as the hydrophilic compound, and 0.1 parts by weight of tin dibutyl dilaurate was used as the reaction catalyst.

Comparative Example 9B

The following composition was obtained for reaction with the primer layer 2. Specifically, a composition of Comparative Example 9B was obtained in an amount of 100 parts by weight in the same manner as in Example 1B except that 89.0 parts by weight of disodium polyoxyethylenealkyl sulfosuccinate (25 wt % aqueous solution, NEO-HITENOL S-70 manufactured by Dai-ichi Kogyo Seiyaku Co., Ltd.) was used as the hydrophilic compound, 1.0 parts by weight of N,N-dimethylbenzylamine was used as the reaction catalyst, and urea was not added.

Comparative Example 10B

In a state in which the primer layer was not provided, a composition of Comparative Example 10B was obtained in an amount of 100 parts by weight in the same manner as in Examples 1B.

Compositions of Examples 1B to 15B, and Comparative Examples 1B to 10B are shown in Tables 13 and 14.

TABLE 13

| | | | | Examples | | | | | | | |
|---|---|---|---|---|---|---|---|---|---|---|---|
| | | | | 1B | 2B | 3B | 4B | 5B | 6B | 7B | 8B |
| | Primer layers (1B and 2B) | | | 1B | 1B | 1B | 1B | 1B | 1B | 1B | 1B |
| Hydrophilic compound | Compound name or product name | Reactive functional group | Hydrophilic group | | | | | | | | |
| | Sodium 2-aminoethyl sulfonate | Amino group | Sodium sulfonate | 50.0 | | | | | 50.0 | 50.0 | 50.0 | 50.0 |
| | Potassium 2-aminoethyl sulfonate | Amino group | Potassium sulfonate | | 50.0 | | | | | | |
| | 2-aminoethyl sulfonic acid | Amino group | Sulfonic acid | | | 25.0 | 25.0 | | | | |
| | Sodium 4-aminobenzene sulfonate | Amino group | Sodium sulfonate | | | | | | | | |
| | Sodium 2-hydroxyethyl sulfonate | Hydroxyl group | Sodium sulfonate | | | | | | | | |

TABLE 13-continued

| | | | | Examples | | | | | | | |
|---|---|---|---|---|---|---|---|---|---|---|---|
| | | | | 1B | 2B | 3B | 4B | 5B | 6B | 7B | 8B |
| | Sodium 3-mercapto-1-propane sulfonate | Mercapto group | Sodium sulfonate | | | | | | | | |
| Reaction catalyst | Tin dibutyl dilaurate | | | | | | | | | | |
| | N,N-dimethylbenzylamine | | | | | | | | | | |
| Compatibilizer | Urea | | | 10.0 | 10.0 | 10.0 | 10.0 | | | | |
| | Dimethyl sulfoxide | | | | | | | 25.0 | | | |
| | Glycerin | | | | | | | | 25.0 | | |
| | Sucrose | | | | | | | | | 10.0 | |
| | 30% aqueous solution of sodium carboxymethyl cellulose | | | | | | | | | | 33.3 |
| | 30% aqueous solution of polyvinyl pyrrolidone | | | | | | | | | | |
| | Sodium hydrogen carbonate | | | | | | | | | | |
| Solvent | Ion exchanged water | | | 30.0 | 30.0 | 55.0 | 55.0 | 15.0 | 15.0 | 30.0 | 6.7 |
| | Isopropyl alcohol | | | 10.0 | 10.0 | 10.0 | 10.0 | 10.0 | 10.0 | 10.0 | 10.0 |
| Catalyst | Methanol | | | | | | | | | | |
| | N-methylmorpholine | | | | | | | | | | |
| Coupling agent | 3-isocynatopropyl trimethoxy silane | isocyanate | | | | | | | | | |
| Solvent | Methanol | | | | | | | | | | |
| | Total | | | 100.0 | 100.0 | 100.0 | 100.0 | 100.0 | 100.0 | 100.0 | 100.0 |

| | | | | Examples | | | | | | |
|---|---|---|---|---|---|---|---|---|---|---|
| | | | | 9B | 10B | 11B | 12B | 13B | 14B | 15 |
| | Primer layers (1B and 2B) | | | 1B | 1B | 1B | 1B | 2B | 2B | None |
| Hydrophilic compound | Compound name or product name | Reactive functional group | Hydrophilic group | | | | | | | |
| | Sodium 2-aminoethyl sulfonate | Amino group | Sodium sulfonate | 50.0 | 50.0 | | | 50.0 | | 50.0 |
| | Potassium 2-aminoethyl sulfonate | Amino group | Potassium sulfonate | | | | | | | |
| | 2-aminoethyl sulfonic acid | Amino group | Sulfonic acid | | | | 62.5 | | | |
| | Sodium 4-aminobenzene sulfonate | Amino group | Sodium sulfonate | | | | | | | |
| | Sodium 2-hydroxyethyl sulfonate | Hydroxyl group | Sodium sulfonate | | | | | 41.7 | | |
| | Sodium 3-mercapto-1-propane sulfonate | Mercapto group | Sodium sulfonate | | | | | | 50.0 | |
| Reaction catalyst | Tin dibutyl dilaurate | | | | | | 0.1 | | | |
| | N,N-dimethylbenzylamine | | | | | | | | 1.0 | |
| Compatibilizer | Urea | | | | | 10.0 | 10.0 | 10.0 | 10.0 | 10.0 |
| | Dimethyl sulfoxide | | | | | | | | | |
| | Glycerin | | | | | | | | | |
| | Sucrose | | | | | | | | | |
| | 30% aqueous solution of sodium carboxymethyl cellulose | | | | | | | | | |
| | 30% aqueous solution of polyvinyl pyrrolidone | | | 33.3 | | | | | | |
| | Sodium hydrogen carbonate | | | | 10.0 | | | | | |
| Solvent | Ion exchanged water | | | 6.7 | 30.0 | 17.5 | 38.2 | 30.0 | 29.0 | |
| | Isopropyl alcohol | | | 10.0 | 10.0 | 10.0 | 10.0 | 10.0 | 10.0 | |
| | Methanol | | | | | | | | | 19.2 |
| Catalyst | N-methylmorpholine | | | | | | | | | 0.8 |
| Coupling agent | 3-isocynatopropyl trimethoxy silane | isocyanate | | | | | | | | 0.5 |
| Solvent | Methanol | | | | | | | | | 19.5 |
| | Total | | | 100.0 | 100.0 | 100.0 | 100.0 | 100.0 | 100.0 | 100.0 |

TABLE 14

| | | | | Comparative Examples | | | | | | | | | |
|---|---|---|---|---|---|---|---|---|---|---|---|---|---|
| | | | | 1B | 2B | 3B | 4B | 5B | 6B | 7B | 8B | 9B | 10B |
| | Primer layers (1B to 6B) | | | 1B | 1B | 1B | 1B | 1B | 1B | 1B | 1B | 2B | None |
| Hydrophilic compound | Compound name or product name | Radical reactive functional group | Hydrophilic group | | | | | | | | | | |
| | Sodium 2-aminoethyl sulfonate | Amino group | Sodium sulfonate | | 50.0 | | | | | | | | 50.0 |
| | Calcium 2-aminoethyl sulfonate | Amino group | Calcium sulfonate | 62.5 | | | | | | | | | |
| | sodium glycine | Amino group | Sodium sulfonate | | | | 62.5 | | | | | | |
| | 2-amino-2-methyl-1-propanol | Amino group | Hydroxyl group | | | | | 27.8 | | | | | |
| | disodium dihydrogen-2-aminoethyl phosphate | Amino group | Sodium phosphate | | | | | | 62.5 | | | | |
| | Tetrahydrofurfuryl alcohol | Hydroxyl group | Tetrahydrofurfuryl group | | | | | | | | 25.0 | | |
| | (2-hydroxyethyl)-trimethyl ammonium chloride | Hydroxyl group | Quarternary ammonium salt | | | | | | | 25.0 | | | |
| | Polyoxyethylenelauryl ether | Hydroxyl group | Polyoxyethylene group | | | | | | | | | 62.5 | |
| | Disodium polyoxyethylenealkyl sulfosuccinate | Hydroxyl group | Polyoxyethylene group | | | | | | | | | 89.0 | |
| Reaction catalyst | Tin dibutyl dilaurate | | | | | | | | | | | 0.1 | |
| | N,N-dimethylbenzylamine | | | | | | | | | | | 1.0 | |
| Compatibilizer | Urea | | | 10.0 | | 10.0 | 10.0 | 10.0 | 10.0 | 10.0 | | | 10.0 |
| | Dimethyl sulfoxide | | | | | | | | | | | | |
| | Glycerin | | | | | | | | | | | | |
| | Sucrose | | | | | | | | | | | | |
| | Sodium carboxymethyl cellulose | | | | | | | | | | | | |
| | polyvinyl pyrrolidone | | | | | | | | | | | | |
| | Sodium hydrogen carbonate | | | | | | | | | | | | |
| Solvent | Ion exchanged water | | | 17.5 | 40.0 | 17.5 | 52.2 | 17.5 | 55.0 | 55.0 | 27.4 | | 30.0 |
| | Isopropyl alcohol | | | 10.0 | 10.0 | 10.0 | 10.0 | 10.0 | 10.0 | 10.0 | 10.0 | 10.0 | 10.0 |
| | Total | | | 100.0 | 100.0 | 100.0 | 100.0 | 100.0 | 100.0 | 100.0 | 100.0 | 100.0 | 100.0 |

Each of the compositions was applied to each of the primer layers 1B and 2B which were formed with respect to crockery that contains silicon oxide in a surface thereof as described in Table 1 and Table 2, and the crockery was dried at 60° C. for 30 minutes by using an electric oven and was left stationary at room temperature for 30 minutes. Then, heating was performed at 120° C. for 30 minutes by using an electric oven to form a coated film. With regard to the composition of Example 3B, after performing heating, cotton fabric immersed in 5 wt % sodium hydroxide aqueous solution was applied to the coated film, and the coated film was washed with water after 5 minutes to neutralize a sulfonic acid group that is a hydrophilic group into sodium sulfonate. In addition, in Example 15B, the primer layers 1B and 2B were not provided. The A solution and the B solution were blended. After application of the resultant blended solution, drying and heating were performed in the same manner as in the method to form a coated film.

On the assumption that the coated film was formed with respect to crockery such as a toilet bowl and a washstand which are installed at a water-using site in a building, and the like, durability of the coated film when being washed with a washing agent, and washability of the coated film with respect to an organic material such as oil and fat as a contaminant, and an inorganic material were evaluated by the following method.

The durability of the coated film that was formed was evaluated by the same method and standard as in Examples of the first aspect and the second aspect.

The washability of the coated film that was formed was evaluated by the same method and standard as Examples of the first aspect and the second aspect.

The washability with respect to an inorganic material was evaluated by the same method and standard as in Examples of the first aspect and the second aspect.

The durability and the washability were measured as described above, and collective results of each of Examples and Comparative Examples are shown in Tables 15 and 16. An example in which the evaluation result of "D" was not present was determined as "marketability is sufficient", and an example in which the evaluation result of "D" was present was determined as "marketability is deficient".

TABLE 15

|  |  |  | Examples | | | | | | | | | | | | | | |
| --- | --- | --- | --- | --- | --- | --- | --- | --- | --- | --- | --- | --- | --- | --- | --- | --- | --- |
|  |  |  | 1B | 2B | 3B | 4B | 5B | 6B | 7B | 8B | 9B | 10B | 11B | 12B | 13B | 14B | 15B |
| Reaction means | Heating | | O | O | O | O | O | O | O | O | O | O | O | O | O | O | O |
| Post-treatment | Neutralization Treatment | | | | | O | | | | | | | | | | | |
| Evaluation | Durability | Initial | A | A | A | A | A | A | A | A | A | A | A | A | A | A | B |
|  |  | Water resistance | B | B | B | B | B | B | B | B | B | B | B | B | B | B | B |
|  |  | Abrasion resistance | B | B | B | B | B | B | B | B | B | B | B | B | B | B | B |
|  |  | Detergent resistance (acidic) | B | B | B | B | B | B | B | B | B | B | B | B | B | B | B |
|  |  | Detergent resistance (neutral) | A | A | B | B | B | B | B | B | B | B | A | A | B | A | B |
|  |  | Detergent resistance (alkaline) | B | B | B | B | B | B | B | B | B | B | B | B | B | B | B |
|  | Washability | Oleic acid removability | B | B | B | B | B | B | B | B | B | B | B | B | B | B | C |
|  |  | Mineral removability | B | B | B | B | B | B | B | B | B | B | B | B | B | B | C |

TABLE 16

|  |  |  | Comparative Examples | | | | | | | | | |
| --- | --- | --- | --- | --- | --- | --- | --- | --- | --- | --- | --- | --- |
|  |  |  | 1B | 2B | 3B | 4B | 5B | 6B | 7B | 8B | 9B | 10B |
| Reaction means | Heating | | O | O | O | O | O | O | O | O | O | O |
| Post-treatment | Neutralization Treatment | | | | | | | | | | | |
| Evaluation | Durability | Initial | A | D | C | D | B | C | C | B | B | D |
|  |  | Water resistance | B | D | C | D | B | C | C | B | B | D |
|  |  | Abrasion resistance | B | D | D | D | B | C | C | B | B | D |
|  |  | Detergent resistance (acidic) | D | D | C | D | D | D | D | D | D | D |
|  |  | Detergent resistance (neutral) | C | D | C | D | D | D | D | D | D | D |
|  |  | Detergent resistance (alkaline) | B | D | D | D | D | C | C | D | D | D |
|  | Washability | Oleic acid removability | D | D | D | D | D | D | D | D | D | D |
|  |  | Mineral removability | D | D | D | D | D | D | D | C | C | D |

What is claimed is:

1. A hydrophilic treatment coating composition comprising:
   a hydrophilic compound which contains a functional group that is at least one selected from an amino group, a hydroxyl group, a mercapto group, and an epoxy group, and reacts with a reactive functional group of a silane coupling agent, and a sulfonic acid group or an alkali metal salt of the sulfonic acid group, and which does not contain a hydrophilic portion at a site other than an end of a molecular chain; and
   a polar compatibilizer, wherein
   the polar compatibilizer is at least one member selected from the group consisting of urea, melamine, acryloyl morpholine, dimethyl acrylamide, dimethylaminopropyl acrylamide, isopropyl acrylamide, diethyl acrylamide, hydroxyethyl acrylamide, dimethyl sulfoxide, acetonitrile, N,N-dimethylformamide, ethylene glycol, glycerin, trimethylolpropane, ditrimethylolpropane, erythritol, dipentaerythritol, triose, tetrose, pentose, hexose, sedoheptulose, glucose, maltose, sucrose, lactose, cellobiose, raffinose, acarbose, oligosaccharides, cyclodextrin, dextrin, starch, sodium carboxymethyl cellulose, polyvinyl pyrrolidone, sodium polyacrylate, sodium hydrogen carbonate, sodium carbonate, sodium hydrogen sulfate, and sodium sulfate, and
   the composition does not include a radical polymerization initiator.

2. A hydrophilic treatment coating composition comprising:
   a silane coupling agent that contains at least one reactive functional group selected from an isocyanate group, an epoxy group, an amino group, and a mercapto group;
   a hydrophilic compound which contains a functional group that is at least one selected from an amino group, a hydroxyl group, a mercapto group, and an epoxy group, and reacts with the reactive functional group of the silane coupling agent, and a sulfonic acid group or an alkali metal salt of the sulfonic acid group, and which does not contain a hydrophilic portion at a site other than an end of a molecular chain; and
   a polar compatibilizer, wherein
   the polar compatibilizer is at least one member selected from the group consisting of urea, melamine, acryloyl morpholine, dimethyl acrylamide, dimethylaminopropyl acrylamide, isopropyl acrylamide, diethyl acrylamide, hydroxyethyl acrylamide, dimethyl sulfoxide, acetonitrile, N,N-dimethylformamide, ethylene glycol, glycerin, trimethylolpropane, ditrimethylolpropane, erythritol, dipentaerythritol, triose, tetrose, pentose, hexose, sedoheptulose, glucose, maltose, sucrose, lactose, cellobiose, raffinose, acarbose, oligosaccharides, cyclodextrin, dextrin, starch, sodium carboxymethyl cellulose, polyvinyl pyrrolidone, sodium polyacrylate, sodium hydrogen carbonate, sodium carbonate, sodium hydrogen sulfate, and sodium sulfate.

3. The hydrophilic treatment coating composition according to claim 1, further containing:
a reaction catalyst.

4. The hydrophilic treatment coating composition according to claim 1,
wherein a number-average molecular weight of the hydrophilic compound is 70 to 500.

5. The hydrophilic treatment coating composition according to claim 1, wherein the polar compatibilizer is at least one member selected from the group consisting of urea, melamine, acryloyl morpholine, dimethyl acrylamide, dimethylaminopropyl acrylamide, isopropyl acrylamide, diethyl acrylamide, hydroxyethyl acrylamide, dimethyl sulfoxide, acetonitrile, N,N-dimethylformamide, ethylene glycol, glycerin, trimethylolpropane, ditrimethylolpropane, erythritol, dipentaerythritol, triose, tetrose, pentose, hexose, sedoheptulose, maltose, sucrose, lactose, cellobiose, raffinose, acarbose, oligosaccharides, cyclodextrin, dextrin, starch, sodium carboxymethyl cellulose, polyvinyl pyrrolidone, sodium polyacrylate, sodium hydrogen carbonate, sodium carbonate, sodium hydrogen sulfate, and sodium sulfate.

6. The hydrophilic treatment coating composition according to claim 1, further containing:
a reaction catalyst including an organic tin catalyst.

* * * * *